(12) United States Patent
Giragossian

(10) Patent No.: US 11,099,664 B2
(45) Date of Patent: *Aug. 24, 2021

(54) TALKING MULTI-SURFACE KEYBOARD

(71) Applicant: Hovsep Giragossian, Hollister, CA (US)

(72) Inventor: Hovsep Giragossian, Hollister, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/211,772

(22) Filed: Mar. 24, 2021

(65) Prior Publication Data

US 2021/0223876 A1 Jul. 22, 2021

Related U.S. Application Data

(63) Continuation-in-part of application No. 16/599,835, filed on Oct. 11, 2019, now Pat. No. 10,963,068.

(51) Int. Cl.
*G06F 3/0354* (2013.01)
*G06F 3/02* (2006.01)

(52) U.S. Cl.
CPC ........ *G06F 3/03547* (2013.01); *G06F 3/0213* (2013.01)

(58) Field of Classification Search
CPC .. G06F 1/1626; G06F 3/04883; G06F 3/0488; G06F 2203/04105; G06F 2203/04104
See application file for complete search history.

(56) References Cited

U.S. PATENT DOCUMENTS 5,128,672 A 7/1992 Kaehler
5,920,303 A 7/1999 Baker
(Continued)

FOREIGN PATENT DOCUMENTS

CN 201035502 Y 3/2008
CN 201310378102 11/2013
(Continued)

OTHER PUBLICATIONS

Laura June, Grippity back-typing keyboard. Jan. 8, 2009. https://www.engadget.com/2009/01/08/grippity-back-typing-keyboard-hands-on/.
(Continued)

*Primary Examiner* — Gerald Johnson

(57) ABSTRACT

A stationary input device is provided having at least a plurality of touch-sensitive back surfaces, with adjustable vertical and horizontal angles between those units; a method of dividing the keys of a keyboard into interface groups; each group having a home key and associated with a finger; a method of dynamically mapping and remapping the home keys of each interface group to the coordinates of the associated fingers at their resting position, and mapping non-home keys around their associated home keys on the touch-sensitive back surfaces; a method of calculating and remapping home keys and non-home keys when the coordinates of the resting position shift during operation; a method of providing sensational tactile or haptic bumps or elevations on touch-sensitive surfaces; a method of reading each activated key immediately and automatically; a method of detecting typos and grammatical errors and notifying operators using human speech or other communication methods.

17 Claims, 19 Drawing Sheets

(56) References Cited

U.S. PATENT DOCUMENTS

| | | |
|---|---|---|
| 6,359,572 B1 | 3/2002 | Vale |
| 8,773,356 B2 | 7/2014 | Martin |
| 2006/0129402 A1 | 6/2006 | Park |
| 2007/0036603 A1 | 2/2007 | Swoboda |
| 2008/0181501 A1 | 7/2008 | Faraboschi |
| 2009/0174663 A1 | 7/2009 | Rudd |
| 2009/0195506 A1 | 8/2009 | Geidl |
| 2011/0055256 A1 | 3/2011 | Phillips |
| 2011/0074685 A1 | 3/2011 | Causey |
| 2011/0074692 A1 | 3/2011 | Causey |
| 2011/0078613 A1 | 3/2011 | Bangalore |
| 2011/0216007 A1 | 9/2011 | Cheng |
| 2011/0254762 A1 | 10/2011 | Dahl |
| 2012/0029920 A1 | 2/2012 | Kurzweil |
| 2012/0036121 A1 | 2/2012 | Jitkoff |
| 2012/0075255 A1 | 3/2012 | Krah |
| 2013/0002566 A1 | 1/2013 | Punke |
| 2013/0082932 A1 | 4/2013 | Glückstad |
| 2013/0275907 A1 | 10/2013 | Lau |
| 2013/0278552 A1 | 10/2013 | Kamin-Lyndgaard |
| 2014/0082517 A1 | 3/2014 | Vasudev |
| 2014/0101595 A1 | 4/2014 | Kumara |
| 2014/0104180 A1 | 4/2014 | Schaffer |
| 2015/0109207 A1 | 4/2015 | Li |
| 2015/0293695 A1 | 10/2015 | Schonleben |
| 2015/0346893 A1* | 12/2015 | Schevin ............... G06F 3/043 345/174 |
| 2015/0378391 A1 | 12/2015 | Huitema |

FOREIGN PATENT DOCUMENTS

| | | |
|---|---|---|
| EP | 2406703 B1 | 11/2018 |
| KR | 20090007402 A | 1/2009 |
| KR | 101499301 B1 | 3/2015 |
| WO | 2474890 A1 | 7/2012 |
| WO | WO2012167397 A1 | 12/2012 |

OTHER PUBLICATIONS

Sean Hollister. Microsoft RearType. Aug. 10, 2010. https://www.engadget.com/2010/08/10/microsoft-research-reveals-reartype-puts-qwerty-back-where-it-b/.

* cited by examiner

FRONT VIEW of Separated Units

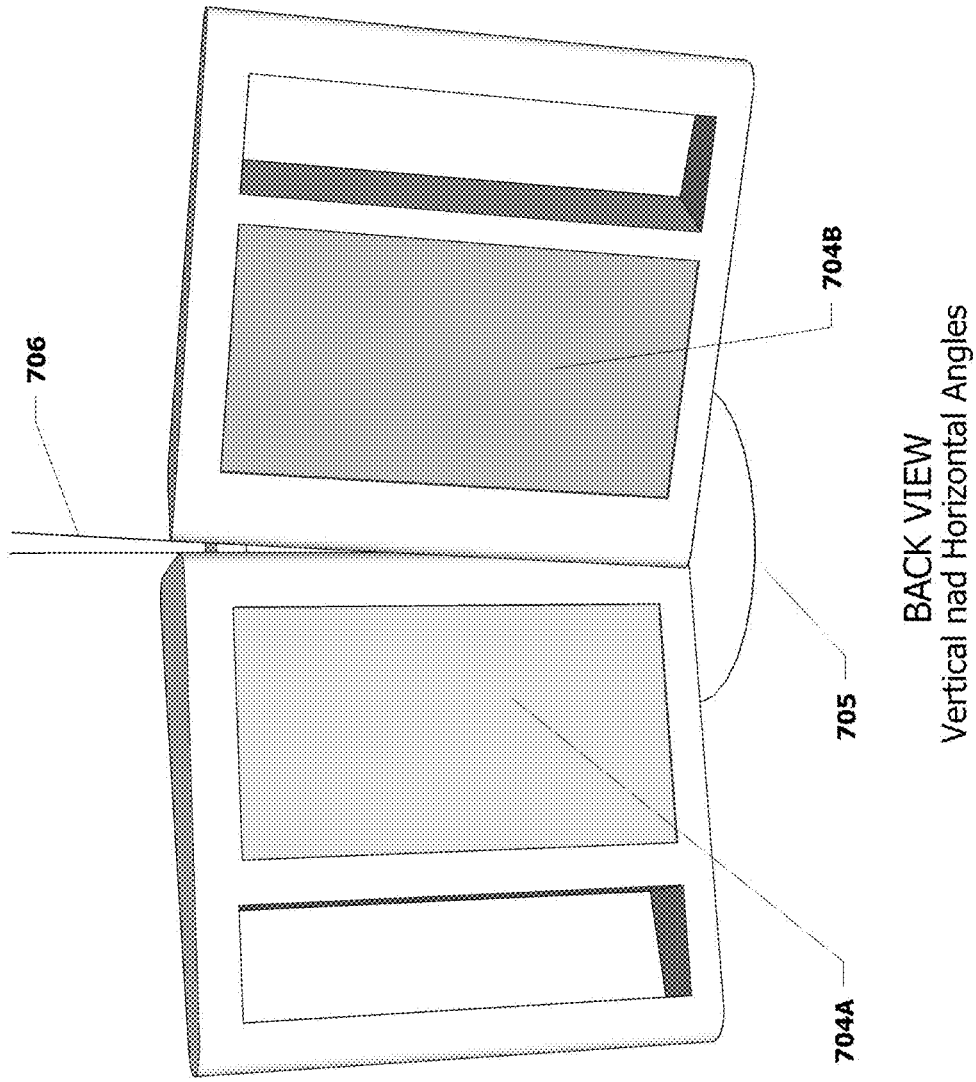

TALKING MULTI-SURFACE KEYBOARD

CROSS-REFERENCE TO RELATED APPLICATIONS

This present application is a continuation-in-part application of U.S. application Ser. No. 16/599,835, filed with title "Talking multi-surface keyboard" and naming Hovsep Giragossian as inventor, which is a continuation application of U.S. application Ser. No. 14/214,710 filed 2014 Mar. 15 by the present inventor. All of the foregoing applications are hereby incorporated herein by reference in their entirety.

TECHNICAL FIELD

The present invention relates to electronic input devices, and more particularly to the broader application of keyboards, key pads, control pads, touch pads, and mouse pads.

BACKGROUND—PRIOR ART

The following is a tabulation of some prior art that presently appear relevant:

| Publication Number | Kind Code | Filing Date | Patentee |
|---|---|---|---|
| US20130275907 | A1 | 2011 Oct. 14 | Hannes Lau and Christian Sax |
| US20070036603 | A1 | 2004 Sep. 22 | Marek Swoboda |
| US20110254762 | A1 | 2011 Oct. 20 | Tobias Dahl et al. |
| US20110055256 | A1 | 2011 Mar. 3 | Michael S. Phillips et al. |
| US20120036121 | A1 | 2012 Feb. 9 | John Nicholas Jetkoff et al. |
| US20140104180 | A1 | 2014 Apr. 17 | Mark Schaffer |
| US20150109207 | A1 | 2015 Apr. 23 | Youngui Li et al. |
| US20130046544 | A1 | 2013 Feb. 21 | David Kay et al. |
| US20060084482 | A1 | 2004 Oct. 15 | Sami Saila |
| U.S. Pat. No. 6,118,432 | A | 1998 Jan. 29 | Radoslav P. Kotorov |
| U.S. Pat. No. 8,799,803 | B2 | 2011 Mar. 3 | Apple Inc. |
| U.S. Pat. No. 8,773,356 | B2 | 2014 Jul. 8 | Kenneth M. Martin et al. |

Data entry has now become one of the dominant methods of our daily communication both at work and in personal life. Pressing a key on a computer keyboard or on a keypad can register and sent a character or a command to a computer or another device. We refer to the term "keyboard" in this application in its broader meaning that applies to devices with a plurality of input keys.

Keyboards with mechanical keys, whether used as desktop computer keyboards or on portable devices are bulky, heavy, noisy, or slow. A flat computer keyboard with key on the front-facing surface can develop Carpal Tunnel Syndrome. Statically positioned mechanical or soft keys on smaller portable devices such as cell phones are mostly activated only by the thumbs of an operator; causing stress on thumbs.

A few inventions introduce computer keyboards with mechanical or soft keys that are statically positioned on the back of said keyboards. This kind of keyboards may have an advantage that the wrist of the operator is not touching the keyboard or carrying the weight of the hand compared to a flat computer keyboard with front-facing keys. However, said keyboards like other keyboards with static keys are inflexible, heavy, bulky, slow, and lead to fatigue of the hands and fingers.

I have found that while operating a keyboard, the arms and wrists of the operator are not in a natural straight line. The wrists are either bent inward, outward, left, or right. The lack of proper alignment causes stress on shoulders, arms, wrists, and fingers; which is not only unhealthy but also slows down data entry. There are two factors contributing to this problem; $1^{st}$, static keys are not flexible and they force or confine the hands and fingers of the operator to the static position of the keys. And $2^{nd}$, as I mentioned earlier, when all keys are positioned on a single back surface, it does not allow flexibility to attain a comfortable and natural posture of the arms and the wrists.

Soft keys may be positioned on a keyboard statically, or mapped dynamically at the point of contact between fingers and said surfaces. Soft keys provide faster data entry; making the keyboard lighter and slimmer. Keyboards with keys positioned on the front-facing surface, regardless of using mechanical keys, soft keys, or dynamically mapped keys, are prone to developing Carpal Tunnel Syndrome. On the other hand, keyboards with static soft keys positioned on the back of a keyboard are dependent on visibility in order to touch and activate said keys correctly. Therefore such keyboards use either a partially transparent or see-through keyboard for viewing the keys on the back surface; which takes away a large portion of the front or top surface for viewing the back keys. Keyboards with mechanical keys that are positioned on the back of a keyboard may have better performance compared to the keyboards with mechanical keys positioned on the front surface. However such keyboards are bulky and don't perform as fast as keyboards with soft keys.

Discomfort and related heath concerns like developing Carpal Tunnel Syndrome from using flat keyboards with front-facing keys currently available in the market hasn't been completely addressed and resolved. Mechanical keys and statically positioned virtual keys reduce flexibility and contribute to slower data entry. Mobile devices like smart phones on the other hand, are becoming increasingly popular for sending text either through text messaging, email, or alternative methods. However, since the size of said mobile devices are relatively smaller compared to a standard US 101 keyboard, the texting interface is either limited to a miniaturized keyboard or a small soft keyboard. Users of said devices can enter text but with only two thumbs. In addition to unhealthy ergonomics, this limitation decreases the typing speed.

Lau et al. (Pub. No.: US 20130275907 A1) provides a flat computer keyboard with dynamically mapped keys on the front-facing surface. Invention in Lau is based on a single front surface like a US 101 computer keyboard. The location of the wrist of an operator is considered in the calculation to determine the coordinates of mapped keys. Invention in Lau however, forces the hands of the operator to rest on the median nerves of the wrists; more like using a conventional US 101 keyboard. When the median nerve is squeezed repeatedly, it leads to developing Carpal Tunnel Syndrome.

Marek Swoboda (Pub. No.: US 20070036603 A1) describes a keyboard with static keys mapped on a single back surface of a device with multiple layers. Each layer is made with transparent or partially transparent material in order to see the keys of said keyboard through layers and to lay fingers on said keys correctly. With this modification, static keys are still viewable. The keys of the keyboard in Swaboda are positioned on the device statically (paragraph [0019]) rather than being mapped dynamically. In other words, the fingers of an operator are confined to the predetermined position of said keys. This limitation leads to slower typing speed and fatigue of wrists and fingers. Since all the layers of said keyboard and the keys have to be transparent or partially transparent (paragraph [0023] and [0024]), it leaves little or no space on the front surface to position other keys or for a display for running applications.

Tobias Dahl et al (Pub. No.: US20110254762 A1) introduces a device that can detect a range of pressures on an elastic surface. Dahl incorporates analog transducers and light sources with semitransparent or fully transparent yielding surface to detect the movement of an object into the yielding surface. Dahl claims that his invention can provide a virtual keyboard to control a computer according to the amount of pressure applied to the yielding surface (paragraph [0025]). Dahl however, does not teach or claim how multiple computer keys could be mapped on a yielding surface, or how computer keys could be mapped dynamically on the back surface either. Improving Dahl in view of Lau would defeat the purpose of the invention in Dahl. Dahl's invention is comprised of analog transducers and light sources to detect a range of pressures and movement of an object even when the object is not touching the yielding surface, while Lau does not detect a range of pressures or detect object above a yielding surface.

Mark Schaffer (Pub. No.: US20140104180 A1) introduces a keyboard with a plurality of bumps, that are statically mounted on the top non-sensitive housing or the top surface of a device like a wrist watch. The fingers of an operator are confined to the static bumps in order to activate a character. After the operator activates one of the bumps with a finger, a list of pre-selected static computer keys are available to choose from. Therefore it takes at least two steps to enter a single character or a key. First, the operator touches one of the bumps with a finger to bring up a menu that is specific to that bump; second, while looking at a display, the operator urges or pushes same finger towards one of the preferred directions. The selected character or computer key is activated after releasing the touch. Schaffer does not make any reference to, or teach how those bumps could be mounted on a back surface and be utilized. Schaffer depends on the display to choose each character and correct misspellings. The nature of Schaffer's multi-step process reduces typing speed.

Youngui Li et al (Pub. No.: US20150109207 A1) introduces an input device with keys statically positioned on the front and side surfaces, and a keyboard with hard keys statically positioned on a single back surface. There are dynamically mapped zones on the back surface but not dynamically mapped keys that follow the touch of each finger. Each zone is comprised of a group of keyboard keys that are pre-positioned on said rectangular mapped zone. Publication US20150109207 A1 was however filed on Nov. 27, 2014; which is after the current invention PPA date of Mar. 15, 2013.

David Kay et al (Pub. No.: US20130046544 A1) introduces a system and method to disambiguate entered text and present word choices. All embodiments introduced by Kay have static soft keys positioned on the front surface of an input device. Kay provides a text-to-speech engine as an input method. A user is notified by vibration or sound when a letter or a character is recognized (paragraph [0104]). The audio input erroneously may generate a word that was not intended by the user. Kay's invention is fully dependent on a display. When there is an unintended word displayed on the display, the user is provided a list of word choices to replace unintended words from a list of word choices (paragraph [0091]). Tactile and sound feedback is used to notify user when a character or a text is recognized, however Kay does not teach of claim having a method of automatically notifying and providing options using human speech when typos or grammatical errors occur.

Sami Saila (pub. No.: US20060084482 A1) also provides a keyboard with keys positioned on the back of the keyboard. All keys are mapped statically on a single surface; therefore it doesn't have the ergonomic privileges of dynamically mapped keys or the flexibility of two back surfaces.

Radoslav P. Kotorov (Pub. No.: U.S. Pat. No. 6,118,432 A) provides a keyboard with mechanical keys mounted on two separate smaller pads. A user may flip the pads over and turn them 90 degrees. This way the user can access the keys on the back of the keyboard. The fingers of the user are confined to the static position of the mechanical keys. Therefore, Kotorov's keyboard inherits the characteristics of mechanical keys; which is bulky and slow.

Apple Inc (Pub. No.: U.S. Pat. No. 8,799,803 B2) provides a keyboard with an array of discrete sensors around the backside edges of a device like an iPad. These sensors may be configures to register a particular character, or an icon based upon the location of the hands of a user. These sensors are referred to as Virtual Buttons. Depending on the location of the hands of the user, a row of computer keys may be registered with said discrete sensors. Each discrete sensor is aligned with the approximate relative location of a finger.

Invention in Apple does not teach if a complete set of QWERTY keys could be mapped dynamically on a plurality of back surfaces of a device in multiple rows. Said array of discrete sensors are static in function and are positioned around a given region of the back side edges. Therefore the limitations of static keys and inflexibility of a single back surface are inherent in this invention.

The aforesaid inventions have a dependency for a display monitor to see and verify that the intended words were typed correctly. Imagine an operator reading from a printed letter and typing it on a computer keyboard. The operator would have to look constantly back and forth on the printed letter and the display monitor. If the operator could focus only on reading the letter, faster typing speed could be achieved.

None of the aforesaid inventions teach a method of informing operators using human speech; reading or pronouncing as each letter or word is correctly entered. There are other forms of notification and verification including information displayed on a display monitor. Yet none of the aforesaid inventions notify operators immediately and automatically. Now let's imagine if, for example, an operator is reading a printed letter and is typing the word "bottle" on a keyboard. If there was a notification facility using human speech, the operator would hear the sound of each letter "b" "o" "t" "t" "l" "e" individually, and then the operator would hear "bottle" as one word. That would help the operator know that the intended word was entered correctly letter-by-letter. The operator wouldn't even need to look back and forth at the printed letter or into a display monitor. There is neither a method of notifying the operator in aforesaid inventions using human speech when typos or grammatical errors occur.

Michael S. Phillips et al (Pub. No.: US20110055256 A1) provides a search facility for web content by transcribing voice into text and feeding said text into the search facility. Phillips also discloses a text-to-speech (TTS) engine. The names that have multiple pronunciations, multiple possible phonetic spellings can be created. Each of those can be repeated to the user using text-to-speech software, and the user can pick the one that sounds closest to the desired pronunciation [0161]. Phillips does not teach or claim that the manually entered text could be routed into the TTS engine and the TTS engine could automatically pronounce each letter individually.

Phillips refers to irrecoverable errors generated while processing an audio input stream by the automatic speech recognition system or ASR. As explained in paragraphs [0135], [0136], and [137], these irrecoverable errors are intended to be displayed to the user. Yet, none of said errors pertain to typos or grammatical errors. Phillips does not have a facility that automatically notifies an operator using human speech when typos and grammatical errors occur. Therefore aforesaid inventions may not benefit in view of Phillips to be notified with human speech and detect typos or grammatical errors, or pronounce each letter and each word using human speech automatically and immediately.

The standard US keyboards and some of other types of keyboards provide a slight mechanical elevation or bump on keys F and J in order to help the user quickly position their fingers at correct keys.

Kenneth M. Martin et al (Pub. No.: U.S. Pat. No. 8,773, 356 B2), Juan Manual Cruz-Hernandez et al (Pub. No.: EP2406703 B1), and a few Korean publications (Pub. No.: KR101499301 B1 and Pub. No.: KR20090007402A) introduce an electronic tactile and sensation that simulates mechanical elevation or bump. However they fail to teach how said electronic tactile could be used on touch-sensitive surfaces on the back of devices, and could be programmed dynamically at first use.

SUMMARY

The following summary provides a simplified form of the concepts that is further described below in the Detailed Description. This Summary is not intended to identify all essential features or a preferred embodiment. Therefore it should not be used for determining or limiting the scope of the claimed subject matter.

I have found that mapping keyboard keys dynamically on a plurality of back static surfaces provides several benefit and advantages that is described briefly in the following.

According to one or more non-limiting exemplary embodiments, an input device is a computer keyboard and mouse combination, having a full set of computer keys dynamically mapped on two touch-sensitive back surfaces, as shown in FIG. 1. Half of said keys are mapped on the left back surface and activated by the left hand of an operator, and the other half of said keys are mapped on the right back surface. A set of mechanical and soft keys are also positioned on the front facing and on the edge surfaces. The operator does not have direct visibility to the back surfaces; neither does need to in order to activate dynamically mapped keys. Therefore it provides for the blind to use one or more of said exemplary embodiments without dependency on visibility of the dynamically mapped keys, or dependency on a display monitor.

According to one or more non-limiting exemplary embodiments, an input device is a computer keyboard that splits into two independent left-hand and right-hand units, where half of a keyboard keys are mapped dynamically onto the back surface of the left-hand unit and the other half of said keyboard keys are mapped dynamically on the right-hand unit. As shown in FIG. 10, said two units may be joined together with a 360 degree rotation swivel joint that is concurrently adjustable by the operator at a preferred vertically and horizontally degrees for the most comfortable posture of arms, wrists, and fingers.

The operator of said two-unit embodiment may hold and operate each unit with each hand while walking or doing other activities without necessarily holding said units close together up in front of his eyes. According to one or more non-limiting exemplary embodiments, said units may have straps or fasteners to be fastened or worn on hands or thumbs; or hang around the neck to provide greater freedom and flexibility of wrists and fingers during operation.

According to one or more non-limiting exemplary embodiments, dynamic keys are mapped on a computer mouse with a touch-sensitive round pad around its sides as show in FIG. 12. According to one or more non-limiting exemplary embodiments, back surfaces are capable of detecting a plurality of fingers, objects, or both. Additionally, said back surfaces can detect different types of forces and a range of pressures from or in proximity of fingers and objects.

According to one or more aspects of the present invention, one or a plurality of surfaces of an input device may be switched into a keyboard, a mouse pad, or into another mode of operation as described later. According to one or more aspects of the present invention, a keyboard that is comprised of two units, helps align and keep natural posture of arms, wrists, and fingers of an operator.

Said dynamically mapped keys provide fingers and hands of an operator moving flexibility that would otherwise force fingers and wrists to be confined to a set of statically positioned keys. The flexibility of moving fingers from the initial resting position during operation provides greater comfort thanks to dynamically mapped keys. Accordingly, operators of mobile devices such as smart cell phones may use all their fingers to enter text rather than being confined to only two thumbs.

Additionally, and according to one or more aspects of the present invention, operators are notified with human speech automatically and immediately when a finger activates a key, after a word is correctly entered, or when a paragraph is completed without grammatical errors. As an example, when an operator needs to read from a printed letter and enter it on a keyboard, there is no need to focus back and forth on the keyboard and a display monitor to verify visually that the intended text was entered correctly. According to one or more aspects of the present invention, operators are notified with human speech automatically and immediately when typos or grammatical errors occur.

As the result of aforementioned ergonomic advantages of one or several embodiments, by maintaining healthier posture of arms, wrists, and fingers, stress and fatigue is reduced or alleviated; yet faster typing speed is achieved. These and other advantages will become apparent by pursuing the following descriptions and accompanying drawings.

DRAWINGS—FIGURES

While multiple non-limiting exemplary embodiments are disclosed, other embodiments will become apparent to those skilled in the art from the following detailed description. As will be realized, the embodiments are capable of modifications in various aspects, all without departing from the spirit and scope of the embodiments discussed herein. Accordingly, the drawings and detailed description are to be regarded as illustrative in nature and not restrictive.

Therefore all disclosed embodiments are described by way of example only, with reference to the accompanying drawings in which, one or more embodiments are illustrated with the same reference numerals referring to the same pieces of an embodiment throughout the drawings. It is understood that the invention is not limited to the embodiments depicted in the drawings herein, but rather it is defined by the claims appended hereto and equivalent structures:

FIG. 7B shows the back view of the 2nd embodiment comprising of two independent units, one for each hand.

DETAILED DESCRIPTION: FIG. 1—FIRST EMBODIMENT

Figure 1:
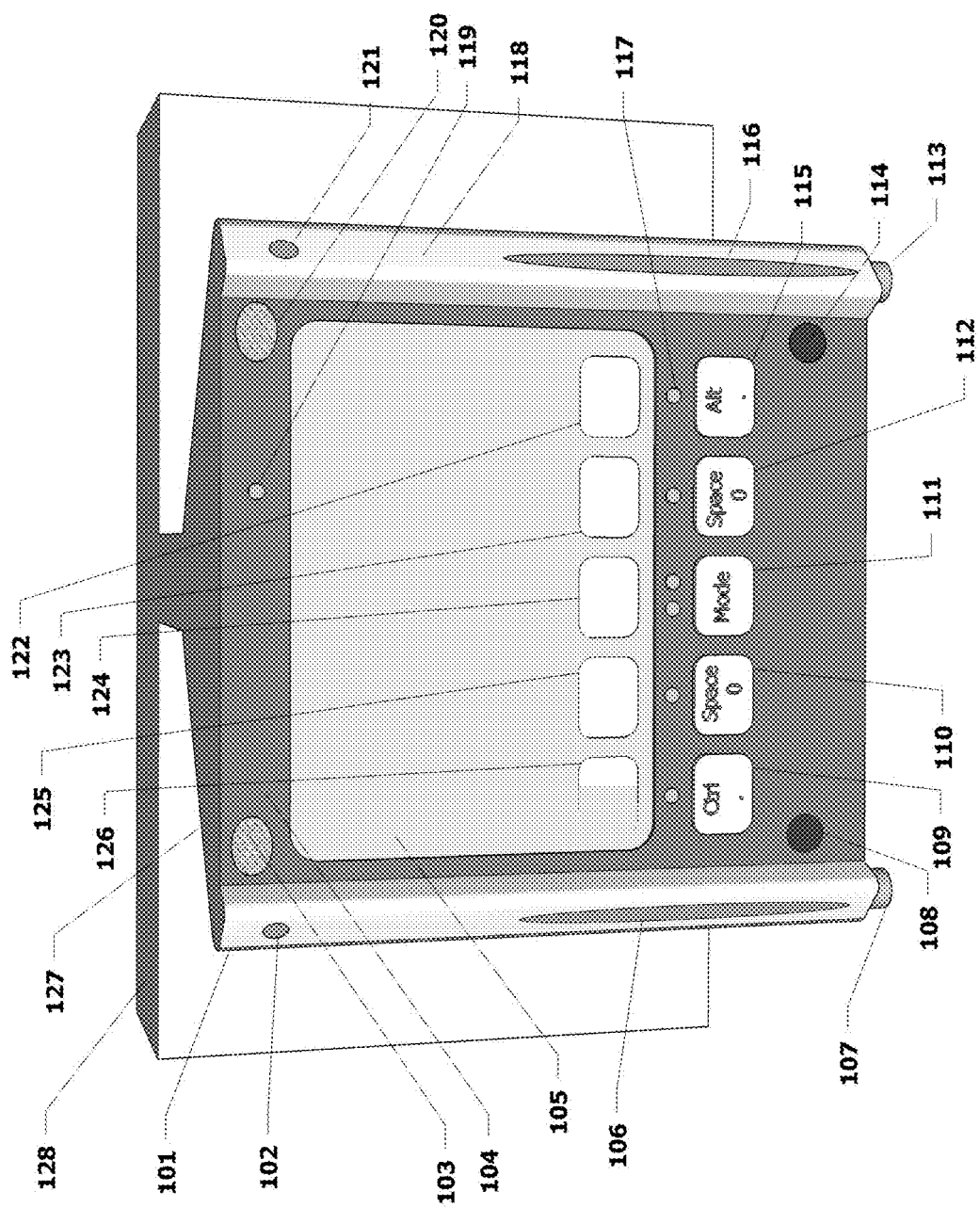
FIG. 1 shows the front of the 1st embodiment with mechanical keys on the front surface, and touch-sensitive surfaces located on the edges. A display screen is in the middle of the front surface, and housing for the main CPU.

FIG. 1 shows the front of the first non-limiting exemplary embodiment. This embodiment provides a touch-sensitive screen or a touch-screen 105, a plurality of mechanical keys 109, 110, 111, 112, and 115, a plurality of soft programmable keys 122, 123, 124, 125, and 126, two speakers 103 and 120, two microphones 108 and 114, a plurality of status or indicator LED lights 117, and one light sensor 119 on a front surface 104. Touch-sensitive pads 102, 106, 116 and 121 located on the right and left curved edges 101 and 118 of the embodiment are capable of detecting ranges of pressure levels from the thumbs and the hands of an operator. Adjustable legs 107 and 113 help keep the embodiment in a comfortable position for use. Said touch-sensitive pads may be positioned on curved edges or on flat, multi-curved, or a combination of flat and multi-curved surfaces of an embodiment. The purpose and benefits of said curved surfaces among other features is to provide further ergonomic convenience for the palm and fingers such that the curvature of said surfaces could be adjusted to the natural resting position of the palm and fingers of operators.

The touch screen 105 is capable of detecting at least the touch of two thumbs simultaneously and to display a plurality of icons, a plurality of running program windows, as well as text boxes and a plurality of programmable soft keys.

Figure 2:
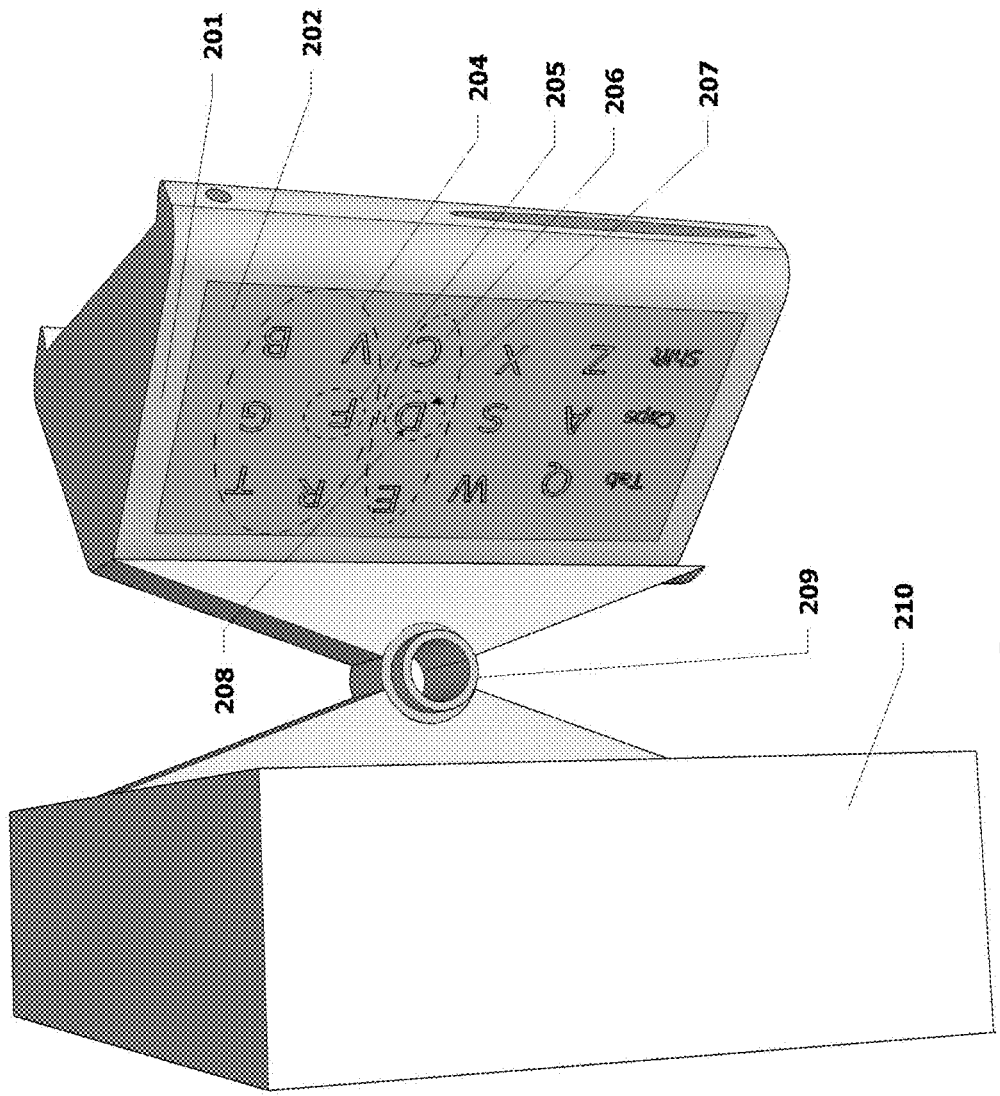
FIG. 2 shows the back of the 1st embodiment with dynamically mapped keys on the right-side touch-sensitive multi-touch surface.

FIG. 2 shows the back view of first embodiment with two back surfaces 201 and 208 (not fully shown), each with touch-sensitive surfaces or touch pads. The left touch-pad 202 as well as the right touch-pad on surface 208 (not shown) are capable of detecting a plurality of fingers on each pad simultaneously. Additionally there is a plurality of invisible environment, motion, and position sensors (not shown).

Both left and right touch pads are capable of detecting a range of pressure levels. Each pressure level describes a specific action, for example, tapping with a finger, touching or resting on the touchpad, sliding or moving a single finger or a plurality of fingers on a touch pad, squeezing a touch pad with the palm of one or both hands, pressing harder on a touch pad with a finger, etc.

Most computer keyboards have alphanumeric keys including home keys A, S, D, F, J, K, L, ;, non-home keys, numeric keys, punctuation keys, mathematical operators, and a set of special keys including function keys. Tab, Caps, Shift, Ctrl, Command, Alt, Scroll, and Delete are examples of special keys. Recent computer keyboards include additional keys to activate and control running programs on the host computer. For example a computer keyboard may have keys to open a web browser, a menu, and Start and Stop keys for playing music. There are associated non-home keys of a home key that are activated by the same finger that activates said home key. For example as shown in FIG. 2, key 205 is the non-home key associated with the home key 209, corresponding to the D key on a QWERTY layout. There are several keyboards with different layouts including QWERTY, Dvorak, Arabic, etc.

The first embodiment (FIG. 2) provides at least a stationary housing 128 for the main CPU, power, main OS and applications, file storage, and ports to communicate with other devices and internet; a moveable housing 127 for the touch-sensitive surfaces, and an adjustable means 211 to adjust the moveable housing in 360 degrees in 3-dimensional sphere. The moveable housing provides a plurality of processors (not shown), a non-volatile storage media (not shown), a volatile storage media (not shown), a source of rechargeable power to provide power when operating wirelessly (not shown); a method of communicating with the local and remote hosts; having first means comprising of several programs; a first program to customize and build new computer layouts; a second program for choosing and activating a layout of the keys, and dividing and assigning said keys into interface groups, a third program for obtaining the initial contact coordinates of fingers at home or at the resting position on the touch-sensitive surfaces, and the contact coordinates of fingers when extended and retracted to activate adjacent keys; having second means comprising of at least a fourth program for detecting normal operation and activities performed by the operator, to map said interface groups dynamically on the touch-sensitive surfaces and to remap said interface groups as the initial coordinates of fingers move or shift; and a fifth program to activate a sound module that receives signals pertaining to activated keys and pronounces each typed letter or command, reads every word, notifies the operator when typos, grammatical, or other errors are detected, and transcribes voice into text and computer commands; and an electronic module to run said programs and other programs, generate codes, display information on a touch screen, and transmit generated codes through wired, wireless, or both methods to a locally attached host, and to one or a plurality of remote hosts. Said fifth program may also use other methods of notification include future and currently available methods including notification through vibration and tactile sensation as described at: http://www.ncbi.nlm.nih.gov/pmc/articles/PMC3100092/.

The non-volatile storage media holds the programs and information pertaining to all available keyboard and keypad layouts, and customized keyboard and keypad layouts. Said programs provide at least BIOS support to initialize and operate the embodiment.

The keys of every available keyboard and keypad layouts are divided into a plurality of interface groups. The elements of each interface group are comprised of one home key and none, one, or a plurality of non-home keys. A non-home key is a key that is activated by the same finger that activates the associated home key. Each interface group is assigned to and activated by one of the fingers of the operator. For example, in FIG. 2 interface group 206 represents interface group D, and is comprised of elements 205, 209, and 210; which represent E, D, and C keys. Element 209 represents the D home key. Similarly, interface group 203 represents interface group F, and is comprised of home key 204 and several non-home keys. Enter key (not shown) is a non-home key of another interface group that represents the Enter key. Enter key is one of the special keys.

TABLE 1

| Interface Group | Home Key | Home and Associated Non-home Keys | Hand | Assigned finger |
| --- | --- | --- | --- | --- |
| A | A | Q A Z Tab Caps Shift | Left | Pinky finger |
| S | S | W S X | | Ring finger |
| D | D | E D C | | Middle finger |
| F | F | R F V T G B | | Index finger |
| J | J | Y H N U J M | Right | Index finger |
| K | K | I K , | | Middle finger |
| L | L | O L . | | Ring finger |
| Semicolon | ; | P ;/' Backspace Enter Shift | | Pinky finger |
| Left Space | Left Space | Space | Left | Left thumb |
| Right Space | Right Space | Space | Right | Right thumb |

Figure 3:
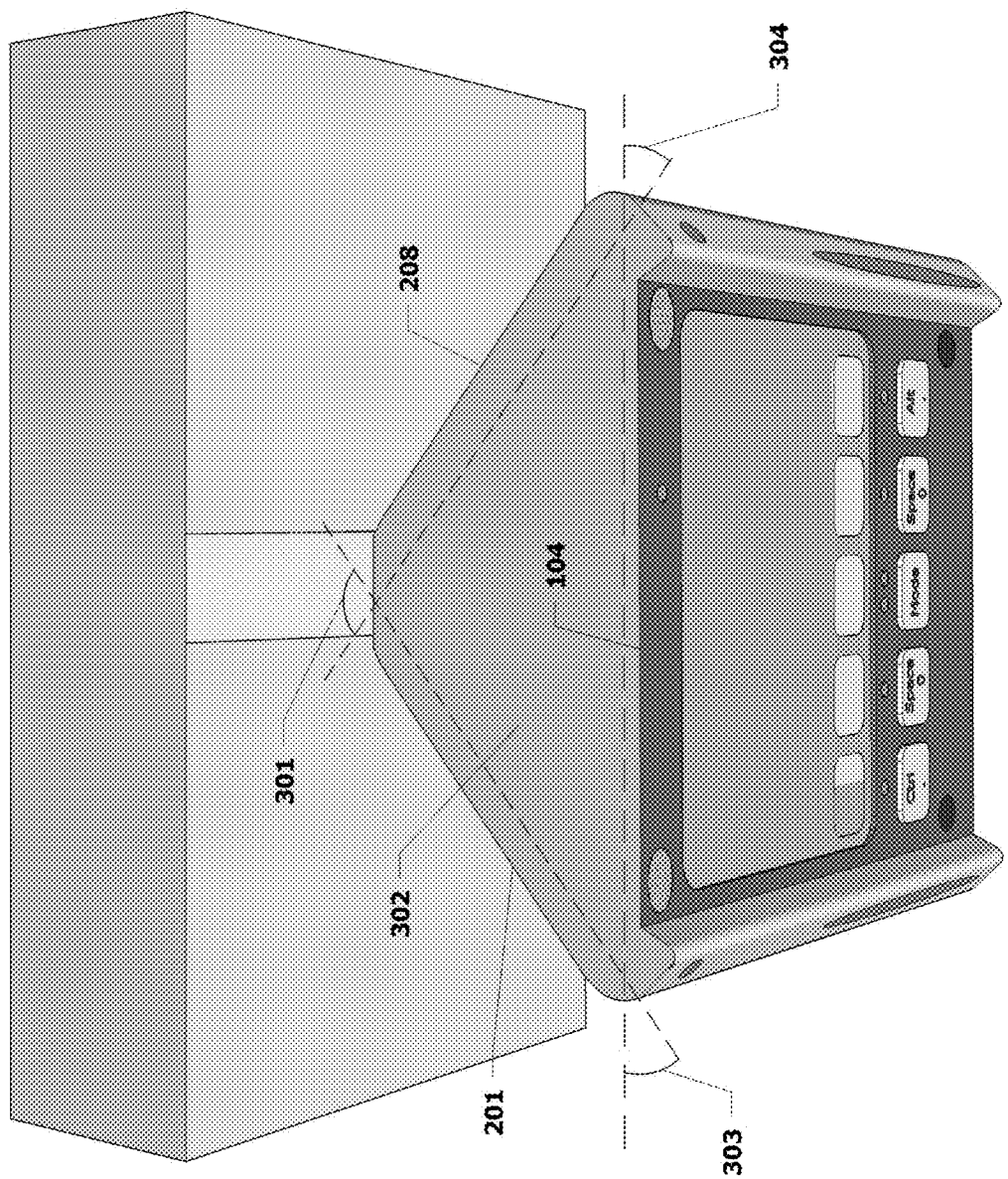
FIG. 3 shows the top of the 1st embodiment with varying angles between the front surface, back right-surface, and back left surface.

Also as shown in FIG. 3, to provide additional comfort for fingers, the back surfaces 201 and 208 are not in parallel with each other. There is an angle 301 between two back surfaces. There are also two angles 303 and 304 between the front surface 104 and two back surfaces that are less than 120 degrees. The top surface 302 is triangular in this exemplary embodiment.

Figure 4:
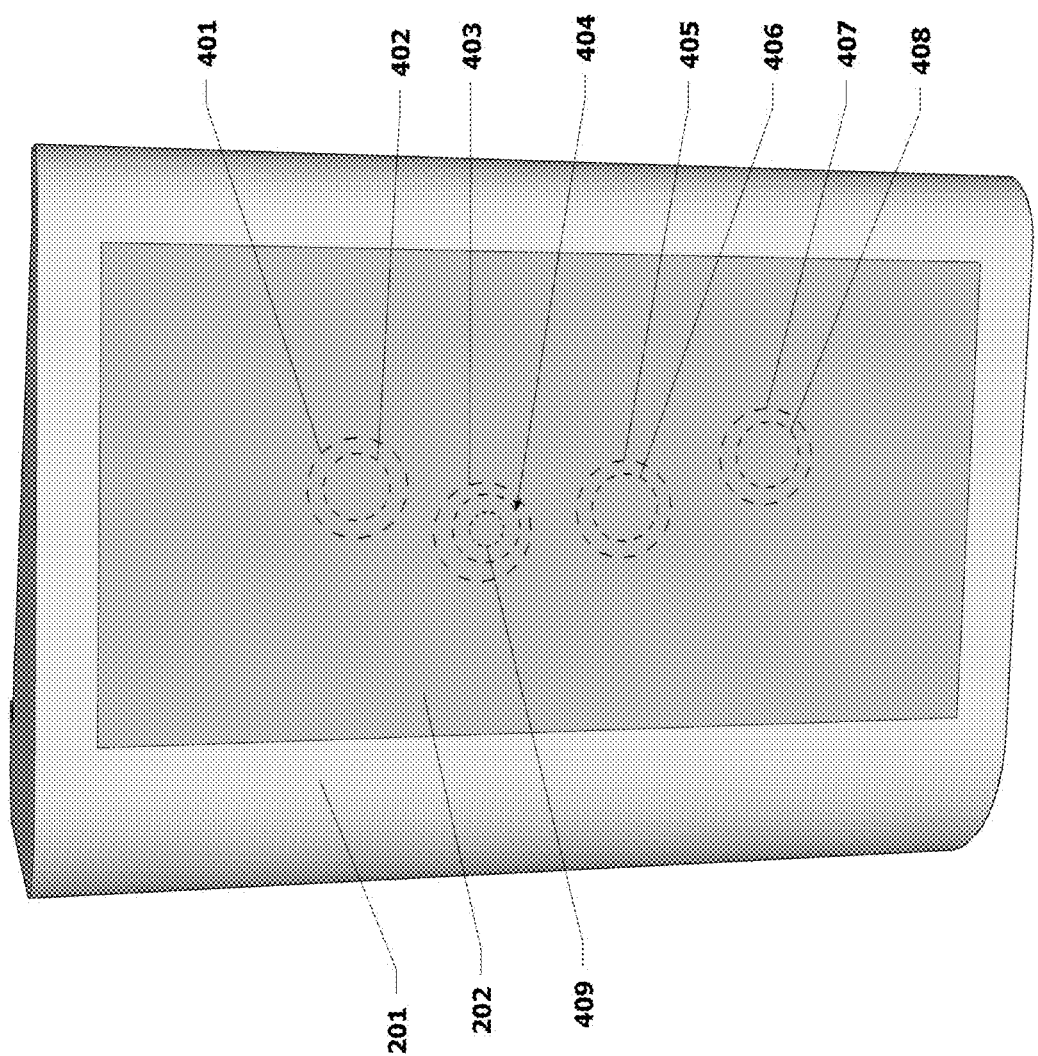
FIG. 4 shows the left back surface; a section of the 1st embodiment, the area touched with the fingers of the left hand, the relative contact points, and the positioning bumps.

FIG. 4 shows touch-sensitive area 202 on back surface 201, where the fingers of the left hand of the operator rest or activate keys. Contact areas 401, 403, 405, and 407 are the areas touched by the Index finger, Middle finger, Ring finger, and the Pinky finger of the left hand respectively. Areas 402, 404, 406, and 408 are the areas assigned or mapped to invisible home keys F, D, S, and A (not shown) to be activated by each respective finger. Optionally, there are fast-positioning bumps or elevations on each of the touch-sensitive multi-touch back surfaces (not all shown) that help users quickly position their left and right fingers at the resting positions on said surfaces. As an example, positioning bump 409 is for resting the left index finger on the F key on mapped QWERY keyboard. Fast-positioning bumps or elevations could be sensed as sensational tactile or haptic feel that is provided electronically, or by physical bump similar to the ones on keys F and J or 5 on standard US keyboards. Each multi-touch back surface may have one or more fast-positioning bumps or elevations. The coordinates of the physical bumps or elevations are static but the coordinates and intensity of sensational tactile or haptic bumps or elevations may be adjusted and preprogrammed dynamically on each multi-touch back surface.

Figure 5:
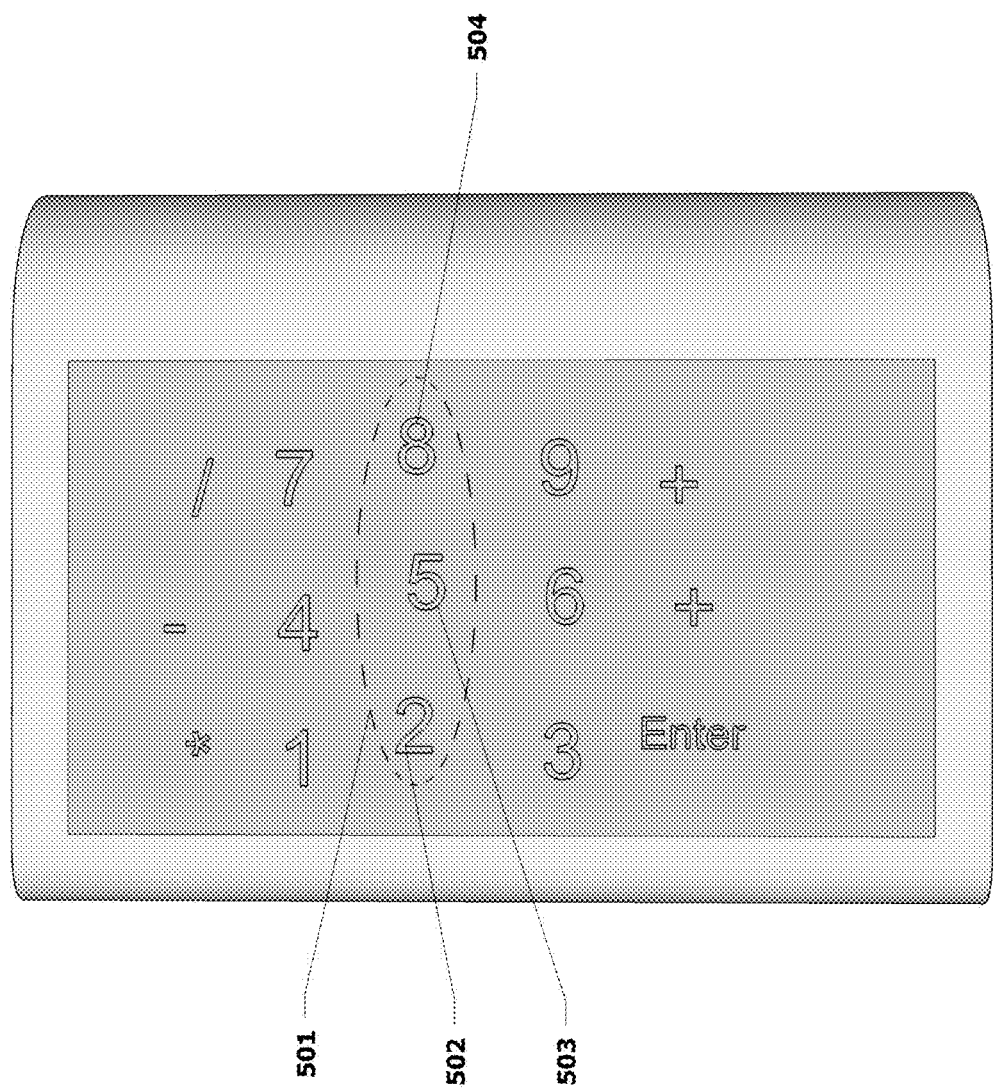
FIG. 5 shows a section of the 1st embodiment with interface groups mapped on the right back surface in Numeric Mode.

FIG. 5 shows a set of numeric keys and arithmetic operation keys. Interface group 501 contains elements 502, 503, and 504. Element 503 represents digit 5; which is the home key of said interface group. Elements 502 and 504 represent digits 8 and 2, which are the non-home keys of digit 5.

Operation—First Embodiment

There are practically unlimited ways of running aforesaid five programs. The following is only an example of running said programs to operate the first embodiment. Holding two mechanical keys 110 and 112 in FIG. 1 for 3 seconds or longer, prompts the operator to choose one of the programs. The operator may call the first program to customize a layout. As part of the customization, the operator may customize each of the keys of a selected keyboard layout, the function of touch pads 102, 106, 116 and 121 located on the edges of the embodiment, the function of each mechanical key, and the function of the soft programmable keys 122, 123, 124, 125, and 126. The operator may choose to assign certain keys to the left and the right thumbs. Either of the touch pads on the back surfaces is set by default to detect 4 fingers each. Yet, the operator may choose to modify that number for each touch pad to match and compensate for missing fingers, or for more than 4 fingers. The operator may customize and alter the assignment of keys to each active finger. Each customized layout may be saved on one of a plurality of non-volatile storages.

The operator, at the first use of said embodiment may call up the second program to choose and activate a keyboard layout. The operator may also call the third program at least once to customize the position of his hands and initial resting position of fingers.

When the third program is called, the operator is prompted to follow a series if instruction to detect and register the contact points of each finger at the resting position on the touch pads on back surfaces, as well as the contact points of each finger when extending or retracting to tap on other areas on the touch pads, as if typing and activating the non-home keys of a keyboard.

The coordinates of the resting position of each finger of each hand, as well as the coordinates of each finger when extended or retracted as if typing on a non-home key, is registered. For example, when the operator is prompted to rest all 8 fingers on the two touch pads on the back surfaces, the third program detects and registers the coordinates of the contact point of the left Index finger at resting position and maps the F key to said coordinates. Then through a sequence of prompts, the operator taps on the left touch pad while extending and retracting the left Index finger as if typing on the non-home keys R, V, T, G, and B on a QWERTY keyboard. The center of each contact point or the coordinates of each contact point between the left Middle finger and the touch pad are grouped together as elements of the F interface group. FIG. 2 shows interface group 203 representing letters F, R and V. This process is repeated for all fingers.

As shown in FIG. 4, area 402 is represents invisible F key (not shown) on the touch pad 202; which is activated with the index finger. Area 402 is the center of area 401 which is the contact point between the left index finger and the touch pad 202. All dynamically mapped keys are invisible soft keys. Each special key, for example, Ctrl, Shift, Delete, etc may be mapped to a mechanical key, soft static key, dynamically mapped soft key, or mapped to a plurality of keys simultaneously.

Figure 6:
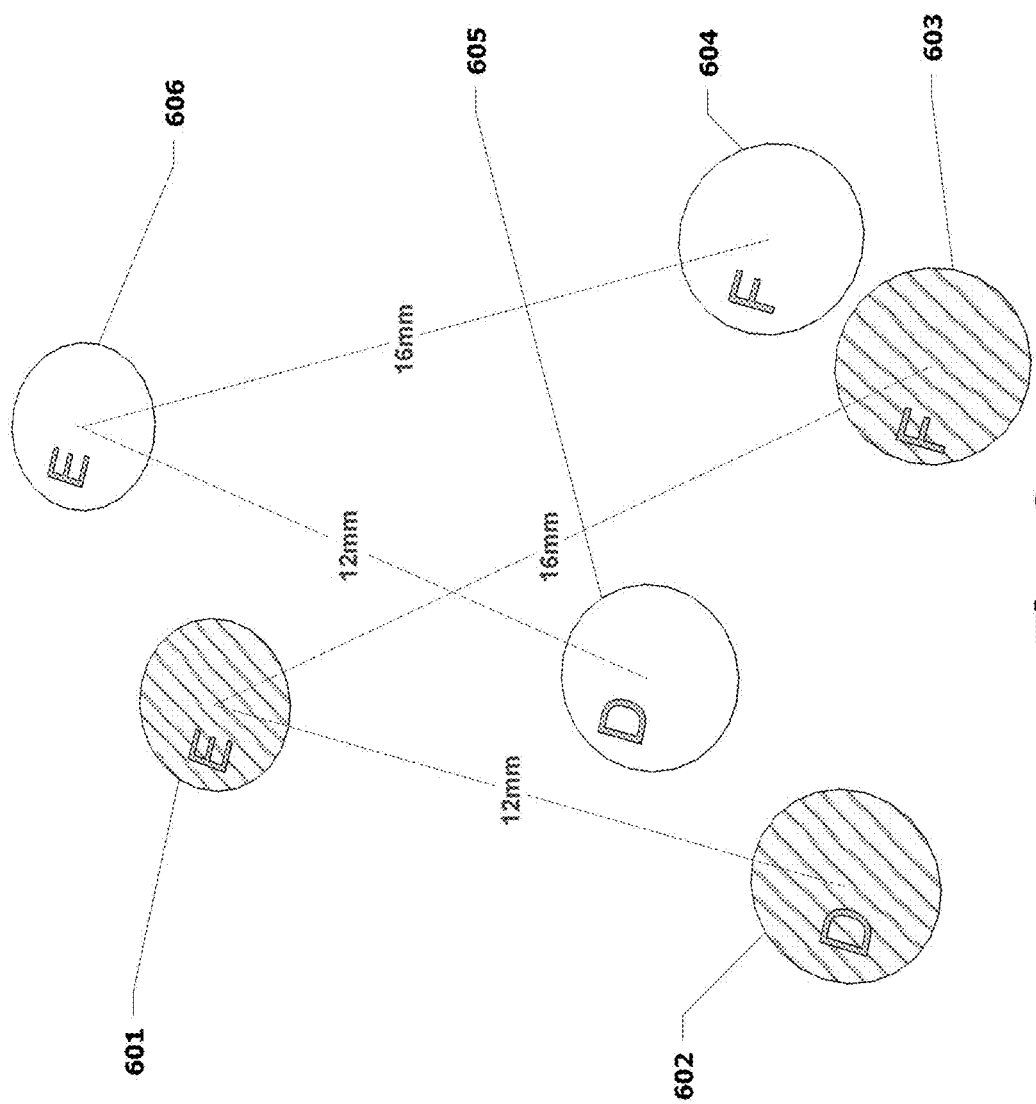
FIG. 6 shows remapping of home and non-home keys when the hands of the operator shift.

Once all contact points or coordinates of all fingers are registered, the third program maps each of the contact points to a key. The third program calculates the distance between each non-home key and its associated home key, and the distance between same non-home key and the next home key. For example, as shown in FIG. 6, the distance between non-home key 601 that represents key E and home key 602 that represents key D, as well as the distance between key 601 and home key 603 that represents key F are calculated and saved together with their coordinates. Said saved information is available to the fourth program.

The fourth program is the main program that runs automatically all the time to detect activities performed by the hands and fingers of the operator and to generate codes relative to each activity on a touch pad or on a touch screen. For example, when the operator taps on the mapped location of key D with the left Middle finger, a character code representing lowercase letter "d" is generated. If the operator was holding the Shift key with right pinky finger while performing the same action, a character code representing uppercase letter "D" is generated.

As the operator's hands move, the location or coordinates of the home keys will also shift and move. Fourth program recurrently detects the new coordinates of fingers at their resting position. The new coordinates of fingers are reregistered and the associated groups of keys are dynamically mapped to the new coordinates. Since the information pertaining to non-home keys and their distances from the two home keys is already available, the new coordinates of the non-home keys are recalculated and adjusted based on the new coordinates of their associated home keys.

For example, in FIG. 6, the current coordinates of two home keys 602 and 603 representing D and F home keys are shown. F key is the neighbor home key of D home key. Key 601 that represents key E is the non-home key of the D home key and is an element of the D interface group. Let's say for example, when the third program ran initially, it registered the distance between the E and the D keys being 12 mm and the distance between the E and F keys being 16 mm.

Let's say for example, that the left hand of the operator moved and shifted slightly. In this example in FIG. 6, the contact point of the left Middle finger 602 is shifted forward slightly. The adjacent home key 603 also moved slightly. The fourth program detects the new coordinates of contact points of the left Middle finger 605 and left Index finger 604 at resting position and remaps D and F keys on the left touch pad accordingly. It also calculates and updates the coordinate of E key 601 and maps it at the location 606; which is 12 mm from the new location of the D home key and 16 mm from the new location of neighbor F home key.

The left and right thumbs of the operator activate the mechanical keys located below the front touch screen, and all soft programmable keys mapped on the touch screen.

The fifth program detects activated keys and automatically pronounces every letter and reads every command and every word that is entered without a spelling mistake. If the operator intended to type in the word "cared" but it was entered as "cares", then the operator would hear what was types and would be able to correct and replace that word. When typos, grammatical errors, or other errors are detected, said program notifies the operator using human speech and provides options to correct typos and other errors. Said program may also use other forms of notification, for example vibration or displaying a message on the display monitor or on the touch screen. Said program may also record and transcribe voice into text and into computer commands, letting the operator only correct errors made during the transcribing process.

There are different modes of operation include Text Mode, Extended Mode, Arrows Mode, Keypad Mode, Mouse Pad Mode, Multiple Mouse Pad Mode, Calligraphic Pad Mode, etc. Other modes of operation may be achieved by creating new customized layouts. The operator may activate any of these modes by pressing a soft key or a mechanical key that is preprogrammed for that purpose. FIG. 1 shows Key 111 that is preprogrammed as the Mode Switch key. Each mode may use specific layouts or a set of specific actions, and assign different keys or actions to each finger of the operator.

In Text Mode, as shown in FIG. 1, mechanical keys 109, 110, 112, and 115 represent Ctrl, left Space, right Space, and Alt keys. Also in Text Mode as shown in FIG. 2, the elements of each interface group represent alpha keys or a combination of alpha and a set of special keys (not shown).

However in Numeric Mode as shown in FIG. 5 the elements of each interface group represent numeric keys and arithmetic operation keys. For example, interface group 501, contains digits 8, 5, and 2 where element 503 is digit 5 home key and elements 502 and 504 that represent digits 8 and 2 are the associated non-home keys.

Table 2 shows interface groups and associated elements in Numeric Mode. In this mode of operation one or both of the touch pads on back surfaces may be mapped with the same interface groups. For example, interface group 5 with elements 8, 5, and 2 may be associated with the left Middle finger, right Middle finger, or both.

TABLE 2

| Interface Group | Home Key | Home and Associated Non-homeKeys | Hand | Assigned finger |
|---|---|---|---|---|
| Minus | Minus | / – * | Left | Pinky Finger |
| 4 | 4 | 7 4 1 | | Ring finger |
| 5 | 5 | 8 5 2 | | Middle finger |
| 6 | 6 | 9 6 3 + Enter | | Index finger |
| 4 | 4 | 7 4 1/Minus * | Right | Index finger |
| 5 | 5 | 8 5 2 | | Middle finger |
| 6 | 6 | 9 6 3 | | Ring finger |
| Plus | Plus | Enter + | | Pinky Finger |
| Zero | Zero | 0 | Left | Left thumb |
| Dot | Dot | . | Right | Right thumb |

Extended Mode provides access to different symbols, function keys, numbers, and special keys. Table 3 shows interface groups and associated elements in Extended Mode. For example, the Middle finger activated elements of interface group 3 in Extended Mode. Function keys F3, F13, and digit 3 key are the elements of interface group 3.

TABLE 3

| Interface Group | Home Key | Home and Associated Non-home Keys | Hand | Assigned finger |
|---|---|---|---|---|
| 1 | 1 | F1 1 F11 | Left | Pinky finger |
| 2 | 2 | F2 2 F12 | | Ring finger |
| 3 | 3 | F3 3 F13 | | Middle finger |
| 4 | 4 | F4 4 F14 | | Index finger |
| 5 | 5 | F5 5 F15 | Right | Index finger |
| 6 | 6 | F6 6 F16 | | Middle finger |

TABLE 3-continued

| Interface Group | Home Key | Home and Associated Non-home Keys | Hand | Assigned finger |
|---|---|---|---|---|
| 7 | 7 | F7 7 F17 | | Ring finger |
| 8 | 8 | F8 8 F18 | | Pinky finger |
| 9 | 9 | 9 | Left | Left thumb |
| 0 | 0 | 0 | Right | Right thumb |
| F9 | F9 | F9 | Left | Left thumb* |
| F10 | F10 | F10 | Right | Right thumb* |

Each thumb may activate at least two mechanical keys located on the front surface below the touch screen. For example, in FIG. 1, right thumb may activate the two far most right mechanical keys.

In Multiple Mouse Pads Mode, or Multiple Pointing Device Mode, both touch pads located on the back of the embodiment become mouse pads. In this mode, one or a plurality of fingers of each hand may control the movements of a mouse or perform different activities independently or together. For example, by sliding the Index finger of the left hand on the left touch pad, the operator can move the pointer of the $1^{st}$ mouse and perform another action by tapping with the same finger on the touch pad. Similarly, the Index finger of the right hand may perform the same action with the left Index finger, but to control a $2^{nd}$ mouse. Additionally, when using 2 fingers, 3 fingers, or even 4 fingers simultaneously, the operator may perform either one of the common actions of a typical mouse, or execute a series of actions that otherwise would take several steps to accomplish. For example, in a drawing program, by using two index fingers, the operator may grab the two ends of a line, move and stretch it to fit in a new location, which otherwise, the operator would have to move each end of the line one step at a time. In another example, the operator may rotate, zoom, and perform other actions on an object simultaneously by using several fingers of a hand or two.

Table 4 below shows an example of the functions that may be assigned to each finger. As stated earlier, by combining functions of a plurality of fingers, a new set of function may be derived. These new functions may expand the capabilities of currently available computer programs or, benefit and expand the capabilities of programs that will become available in the future due to said derived new set of functions.

TABLE 4

| Interface Group | Home Key | Home and Associated Non-home Keys | Hand | Assigned finger |
|---|---|---|---|---|
| | | | Left | Pinky finger |
| Zoom | Zoom | Zoom-in Zoom-out | | Ring finger |
| Rotate | Rotate | Rotate Page-up Page-down | | Middle finger |
| Mouse-1 | Mouse-1 | Mouse-1 | | Index finger |
| Mouse-2 | Mouse-2 | Mouse-2 | Right | Index finger |
| Rotate | Rotate | Rotate Page-up Page-down | | Middle finger |
| Zoom | Zoom | Zoom-in Zoom-out | | Ring finger |
| | | | | Pinky finger |
| Hold | Hold | Hold | Left | Left thumb |
| Hold | Hold | Hold | Right | Right thumb |

In Arrows Mode, tapping with the right Index finger on its resting location will move the cursor or the selected object to the left; tapping with the right Ring finger on its resting location will move the cursor or the selected object to the right, and tapping with the right Middle finger above or below its resting location will move the cursor or the selected object up or down accordingly. Same functions may be achieved by the fingers of the left hand.

Different functions may be assigned to the touch pads located on the left and the right edges of the first embodiment and it may vary depending on the selected layout or modes of operation. In FIG. 1, tapping on touch pads 102 or 121 may provide status updates on certain programs, while tapping on touch pads 106 or 116 may, for example change font size or sound volume.

The operator of the first embodiment may adjust the movable hosing 127 as desired for the most ergonomic convenience. As shown in FIG. 1, adjustable legs 107 and 113 help keep the keyboard at a comfortable angle.

Thus, since the computer keys in the first embodiment are mapped dynamically, and on two back surfaces, it provides faster typing speed and greater ergonomic advantage. The blind, or people with different personal preferences may customize it according to their preferences.

DETAILED DESCRIPTION—FIGS. 7A AND 7B—SECOND EMBODIMENT

Figure 7A:
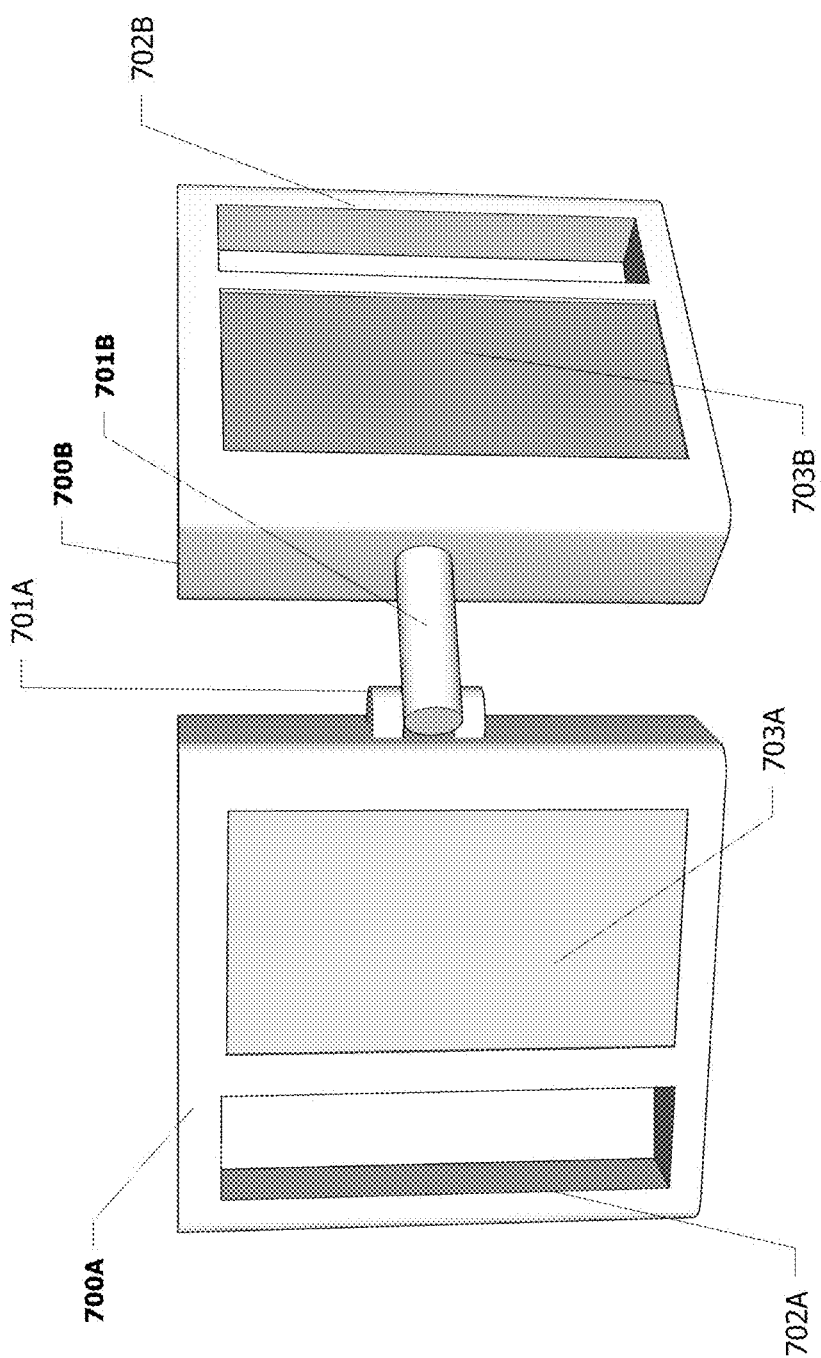
FIG. 7A shows the front view of the 2nd embodiment comprising of two independent units, one for each hand.

The second non-limiting exemplary embodiment as shown in FIG. 7A and FIG. 7B provides two independently adjustable units; one for each hand. The front touch pads 703A and 703B are visible in the front view, and back touch pads 704A and 704B are visible in the back view. There are two slits or openings 702A and 702B to insert hands and reach the back surface with fingers. Second embodiment may be modified by adding hand straps (not shown) instead of the open slits. Each unit is labeled accordingly and is used by the respective hand. Adjustment parts 701A and 701B adjust the distance between two units and adjust the angle of each unit in 360 degree in a 3-dimensional sphere, independent of each other. The operator may adjust the horizontal angle 705 and vertical angle 706 between said two units for greater ergonomics, comfort, flexibility, performance, and speed. As shown in FIG. 7B, the angles between the two units are adjusted such that for example the horizontal angle 705 in is less than 180 degrees and the vertical angel 706 is greater than zero. For additional flexibility, as an additional example of and non-limiting exemplary embodiment, the reattachment parts can be a 360 degree rotation swivel joint that can revolve in both vertical or horizontal directions such that it may provide even greater flexibility and comfort for the hands of the operator.

The same set of volatile and non-volatile storage media, sound module, power module, electronic circuitry, and programs available on the first embodiment are built into the second embodiment (not shown). Therefore, all functions and capabilities of the first embodiment are available on the fourth embodiment.

Operation—Second Embodiment

The second embodiment operates like the first embodiment but without a front touch screen as shown in FIGS. 7A and 7B. The operator may use it in any operational mode.

DETAILED DESCRIPTION—FIG. 8—THIRD EMBODIMENT

Figure 8:
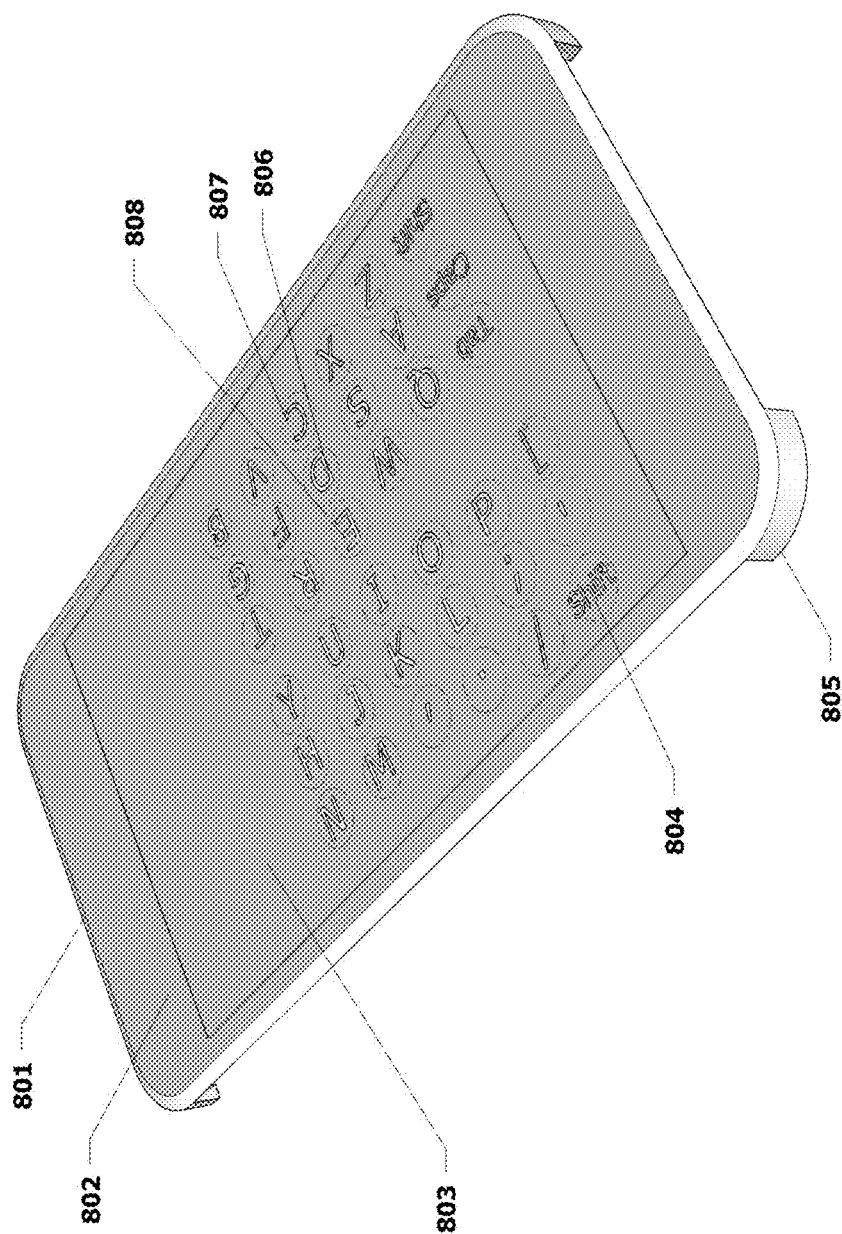
FIG. 8 shows the 3rd embodiment as an attachment to an existing stationary device.
Figure 11:
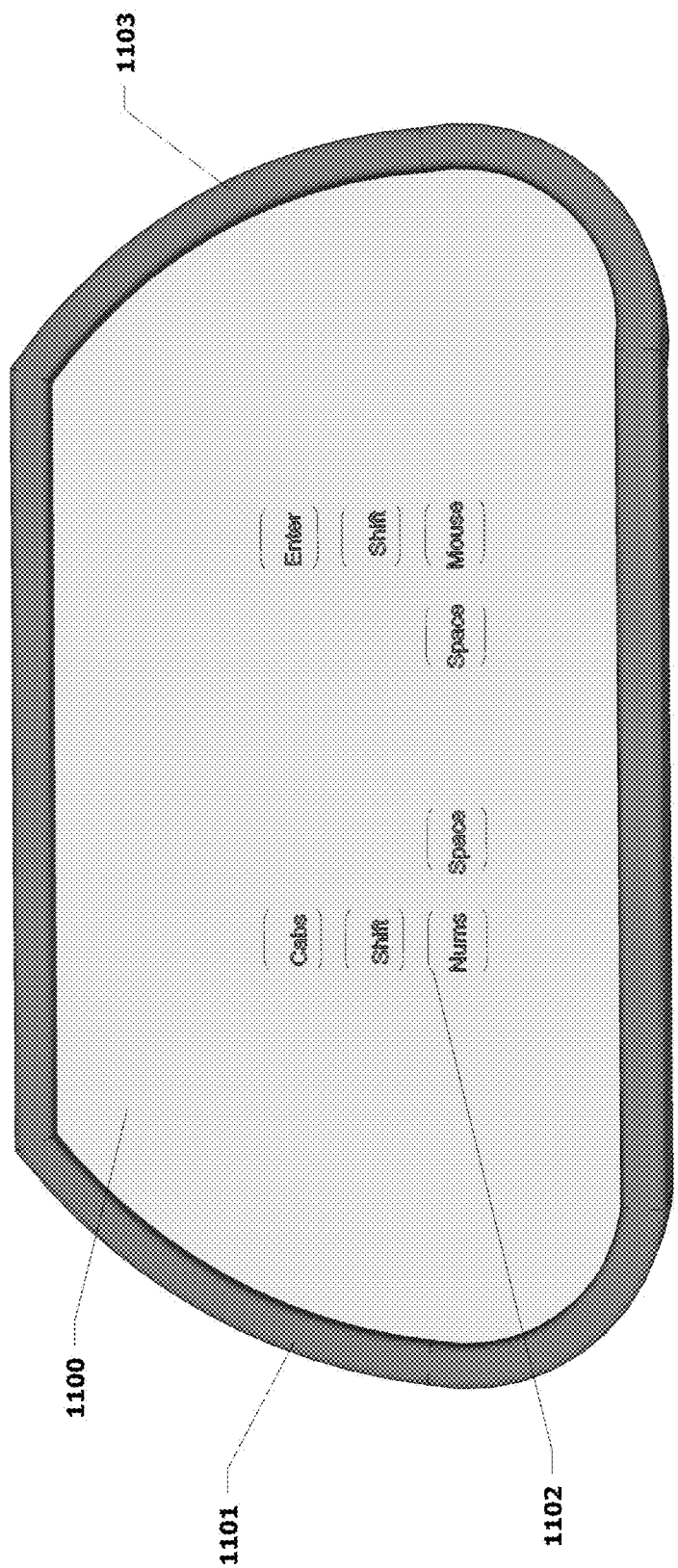
FIG. 11 shows the 6th embodiment with curved sides.

The third non-limiting exemplary embodiment 801 provides a touch pad 803 and a communication module (not shown). It may be attached to a mobile or a stationary device. FIG. 8 shows said embodiment to be attached to the front or back of an existing keyboard, keypad, or a mouse pad. Attachment arm 805 is shown in FIG. 11. Other attachment methods may also be used. Invisible soft keys 806, 807, and 808 are dynamically mapped on touch pad 803; which is built on surface 801. Soft key 806 represents letter D in Text Mode. Soft key 804 is the Shift key. The performance and features of the third embodiment is the same as the performance and features of the first embodiment. It connect to the host wirelessly or though a wire. Said embodiment recharges its batteries (not shown) when connected to the host with a wire; or is powered up wirelessly by the host, or is recharged wirelessly by other devices, or it recharges itself with Solar cells (not shown) built on surface 802. Said embodiment also makes use of the memory and other resources of the host.

Operation—Third Embodiment

An operator attaches the third embodiment to the front or back of an existing keyboard, keypad, or a mouse pad and connects it to the host through a wire, for example a USB cable, or enables wireless connection to the host. The operator installs and runs the same set of programs on the host that is available on the first embodiment. This is to configure and customize the third embodiment. Operation and feature of the third embodiment is the same as the operation and features of the first embodiment.

DETAILED DESCRIPTION—FIG. 9—FOURTH EMBODIMENT

Figure 9:
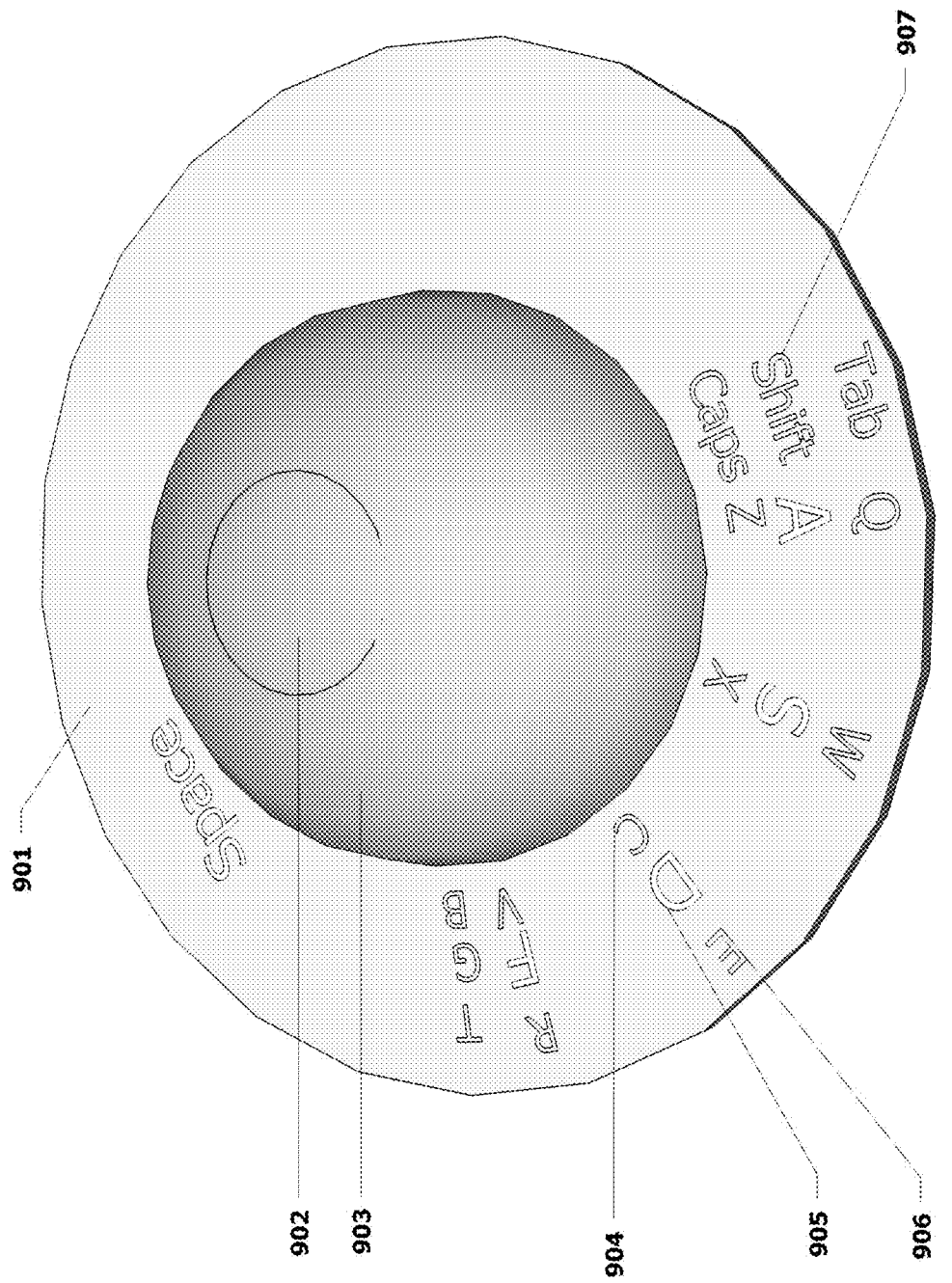
FIG. 9 shows the 4th embodiment as an enhanced mouse with a round touch pad.

The fourth non-limiting exemplary embodiment provides two units that operate like a computer mouse but with a round touch pad around each mouse as shown in FIG. 9. One of the units is assigned to the left hand and the other assigned to the right hand. Each unit labeled for each hand accordingly. Each unit may have a plurality of touch pads. FIG. 9 is an example of a unit operable with the right hand. Both units may operate independent of each other or complement each other. The central holding cup 903 has a pressure sensitive pad 902 that is activated by the palm of an operator. A round touch pad 901 is attached around the cup 903. Keys 904, 905, and 906, are the keys of interface group D in Text Mode; which are dynamically mapped on the touch pad 901. Element 907 is the Shift key. The right-click and left-click buttons as well as mode switch button and scroll buttons are also available but not shown. Both units contain the same modules and programs available on the first embodiment. Both units may communicate with a host computer through a wire or wirelessly. Configuration information may be saved on the host and recalled when necessary.

The fourth embodiment makes use of the memory and other resources of the host.

Operation—Fourth Embodiment

Assuming that we are using the right hand unit in this example, the operator lays his right hand on the cup 903 and rests his fingers on the round touch pad 901. The operator runs the initial configuration program by pressing and holding the pressure sensitive pad 902. Fourth embodiment is configured and operates like the first embodiment except as described otherwise.

The mouse pointer in said embodiment is moved either by switching the touch pad into a mouse pad by pressing the mode switch button (not shown). The operator may call the first, second or the third program by pressing and holding on the pressure sensitive pad 902 for more than 3 seconds. Once configured, the operator may use the round touch pad 901 to enter text or use it as a computer mouse pad. Since both left-hand and right-hand units may be active simultaneously, the operator may perform advanced mouse functions with two mouse pads, or control several mice on each pad using a plurality of fingers on each pad.

DETAILED DESCRIPTION—FIG. 10—FIFTH EMBODIMENT

Figure 10:
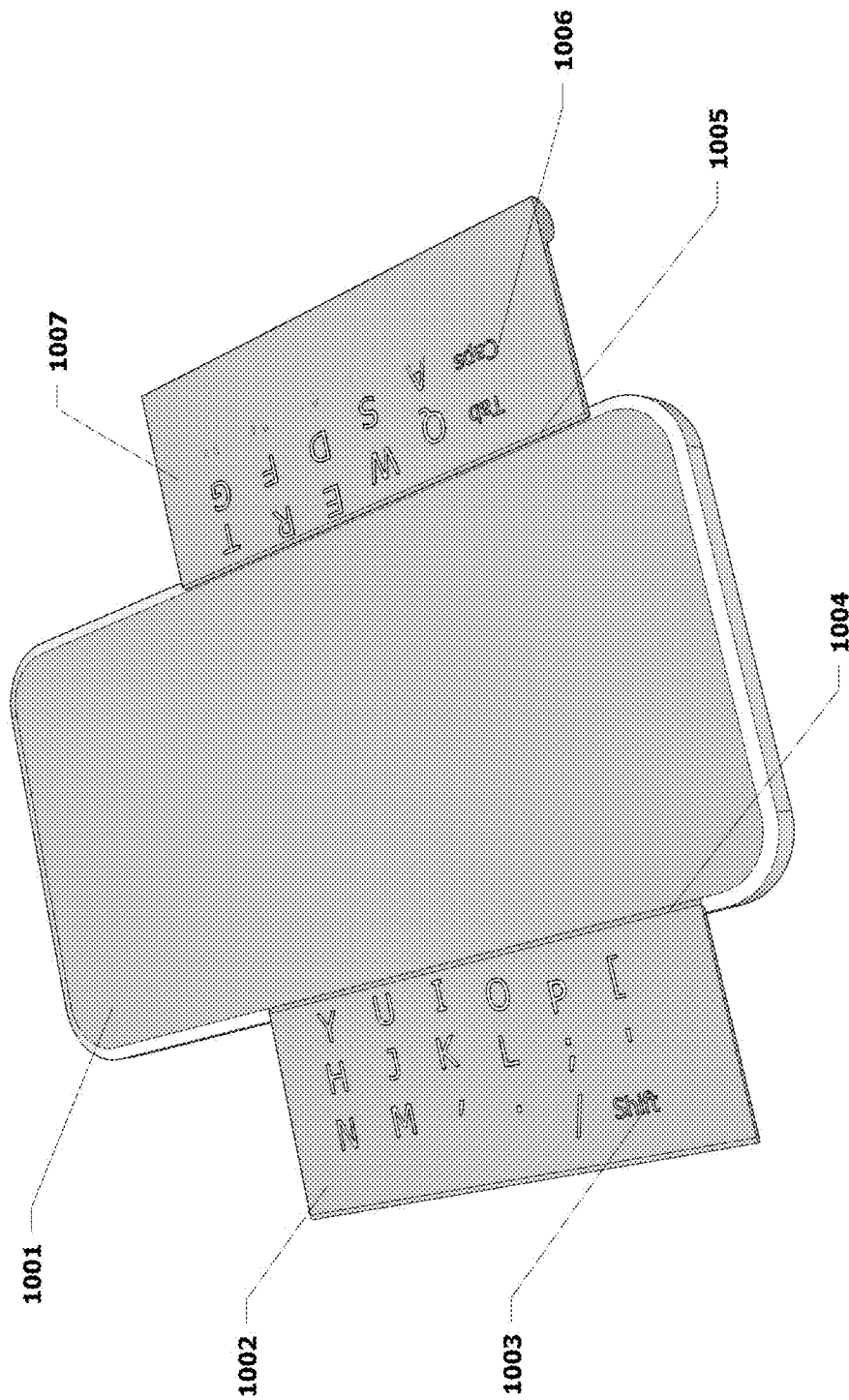
FIG. 10 shows the 5th embodiment with slide-out extended touch-sensitive pads.

The fifth non-limiting exemplary embodiment is an example of a stationary device with slide-out extended touch-sensitive touch pads. FIG. 10 shows slide-out touch pad 1005. Touch pad 1002 is built on the back surface 1001 of said device. Dynamic soft keys 1003 and 1004, as an example, are mapped on touch pad 1002 and slide-out touch pad 1005. Touch pad 1002 is used for the right hand, and slide-out touch pad 1005 is for the left hand of an operator. Other forms of extended touch pad may be manufactured. For example, instead of slide-out touch pad 1005, an extended touch pad that is hinged on the side of said stationary device can be used (no figure).

DETAILED DESCRIPTION—FIG. 11—SIXTH EMBODIMENT

The sixth non-limiting exemplary embodiment as shown in FIG. 11 is an example of a stationary device with smooth and curved contours on the sides that is ergonomically designed to provide most comfort for the hands of operators. Touch pad 1100 is built on said stationary device with contoured sides 1101 and 1103. As an example, soft key 1102 is mapped on touch pad 1100.

DETAILED DESCRIPTION—FIG. 12—SEVENTH EMBODIMENT

Figure 12:
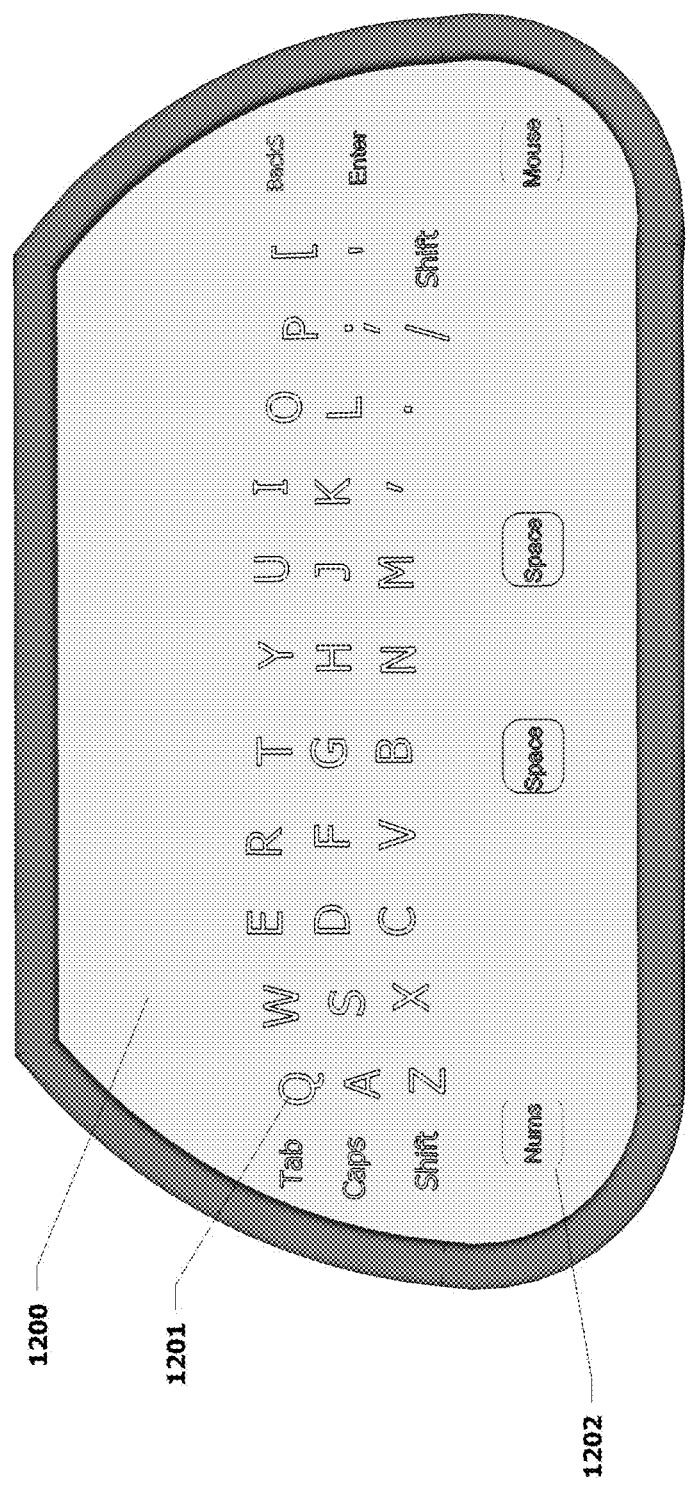
FIG. 12 shows the 7th embodiment with computer keys mapped on the front-facing surface.

The seventh non-limiting exemplary embodiment as shown in FIG. 12 is very similar to the sixth embodiment except that a complete set of computer keys are mapped on the front touch pad 1200 and are activated with the thumbs of an operator. Soft keys 1201 and 1202 are examples of a character key and a control key respectively. The touch pad on the back of the seventh embodiment (no figures) may be programmed as a multi-mouse pad or programmed to function as a numeric pad, symbols pad, or to perform other functions.

DETAILED DESCRIPTION—FIG. 13—EIGHTH EMBODIMENT

Figure 13:
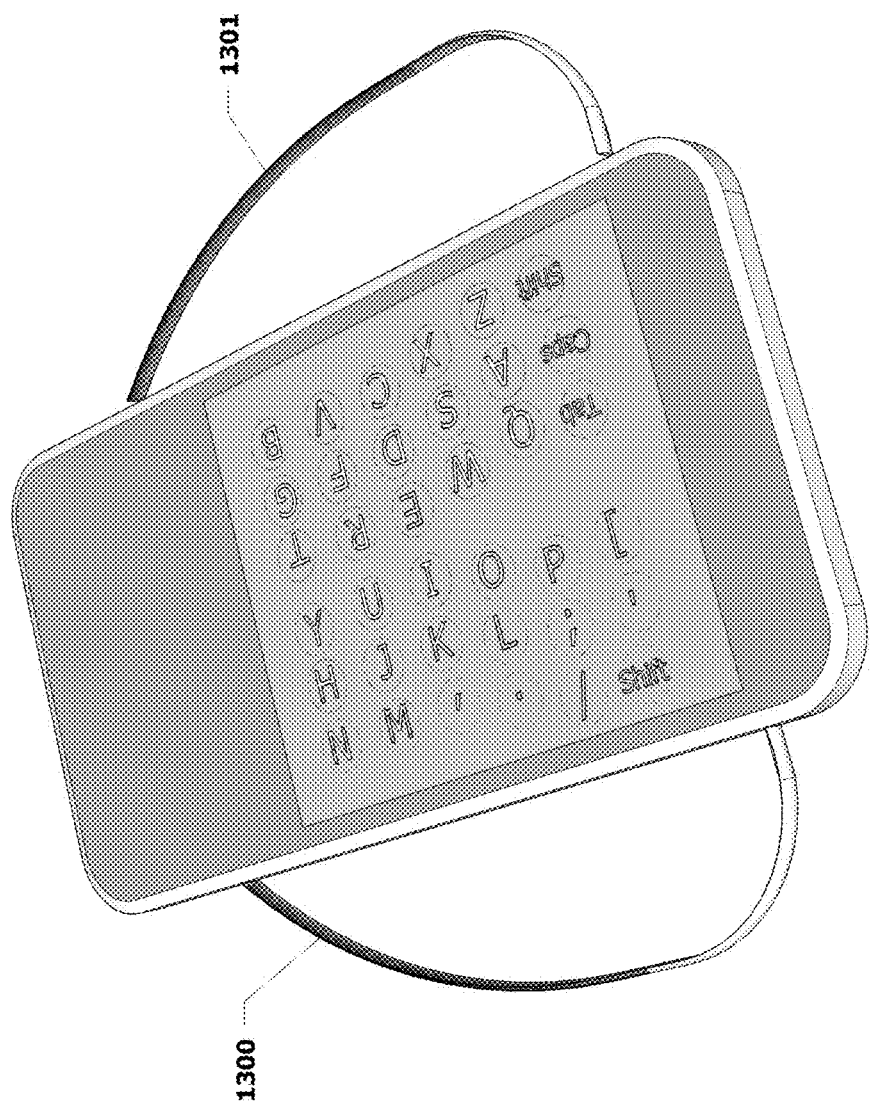
FIG. 13 shows the 8th embodiment with collapsible arms.

The eighth non-limiting exemplary embodiment as shown in FIG. 13 is an example of a device with collapsible sides 1300 and 1301. Said sides may be pushed in or out of the body of said device and locked at a comfortable position.

Operation—Fifth to Eighth Embodiments

Embodiments five, six, seven and eight are also examples of ergonomically designed devices. Said embodiments provide larger surface for fingers of an operator. Said embodiments operate like the first embodiment.

Figure 14:
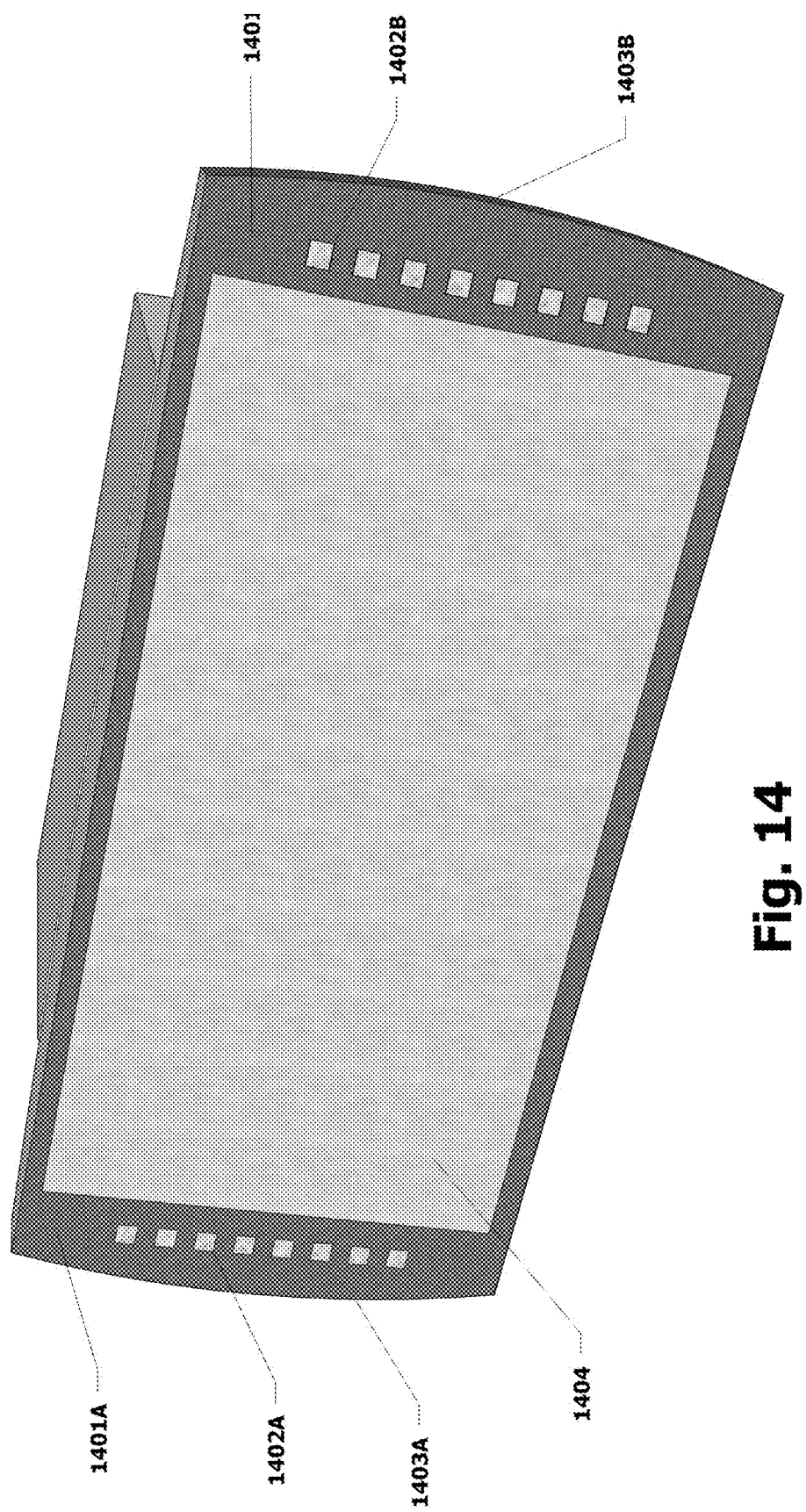
FIG. 14 shows the 9th embodiment with a larger display screen.
Figure 15:
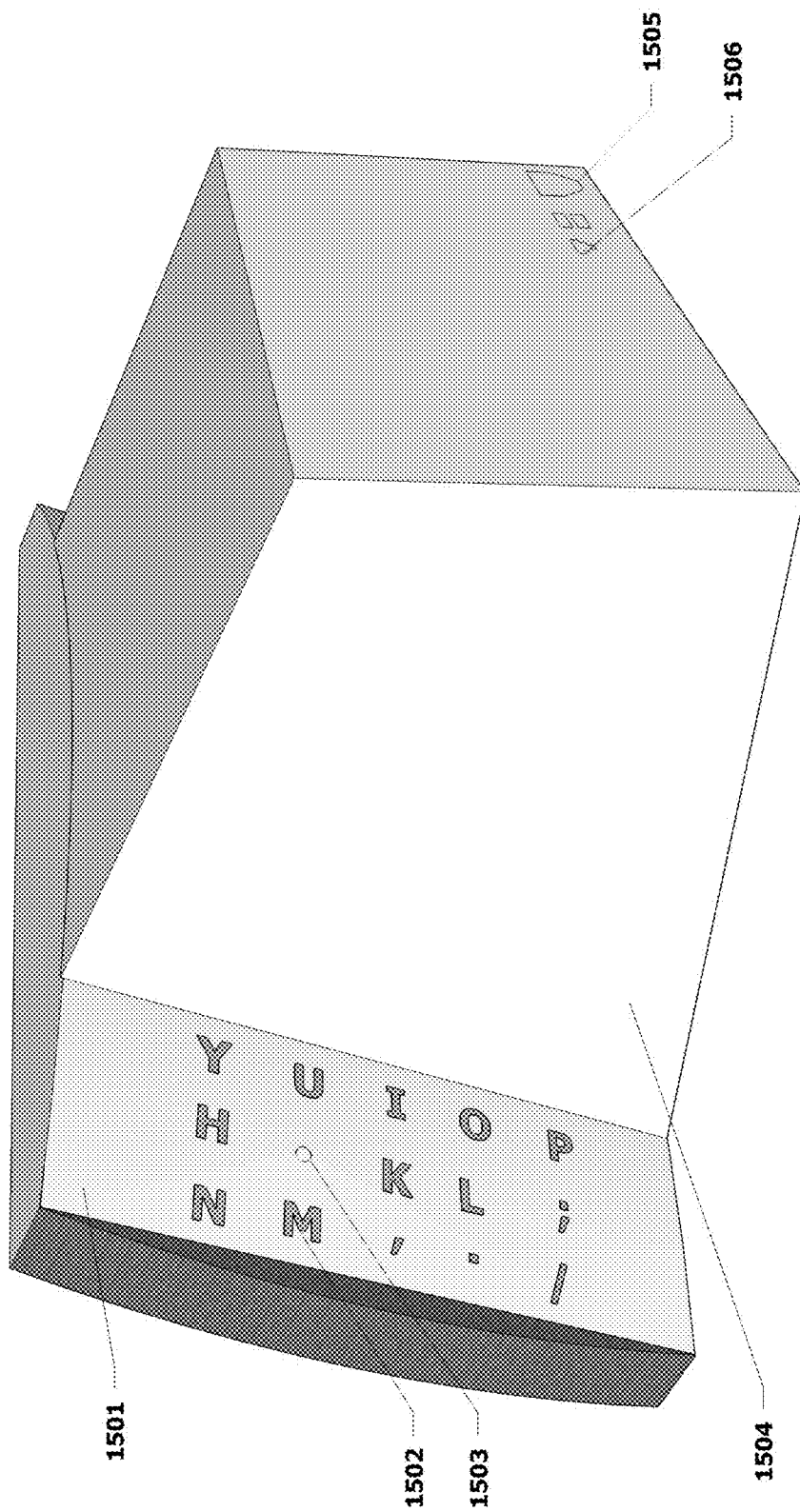
FIG. 15 shows the back of the 9th embodiment.

DETAILED DESCRIPTION—FIGS. 14 and 15—NINTH EMBODIMENT

The ninth non-limiting exemplary embodiment as shown in FIGS. 14 and 15 are another example of a stationary device. FIG. 14 show front surfaces 1401A and 1401B, statically mounted mechanical or soft keys 1402A and 1402B, touch-sensitive multi-touch curved sides 1403A and 1403B, and a large display 1403. As shown in FIG. 15, touch-sensitive multi-touch curved surface 1501 maps keyboard keys dynamically for the right hand. Curved surface 1501 like other exemplary embodiments functions as a keyboard and mouse pad. Mapped key 1502 represents key M on a QWERTY keyboard. Housing 1504 provides main CPU, main OS, applications, file storage and means for a standard or high performing computer. Port 1505 is for power and port 1506 for network connection. Other communication ports are not shown.

Optionally, there are fast-positioning bumps or elevations on each of the touch-sensitive multi-touch back surfaces (not all shown) that help users quickly position their left and right fingers at the resting positions on said surfaces. As an example, positioning bump 1503 is for resting the right index finger on the J key on mapped QWERY keyboard. Fast-positioning bumps or elevations could be sensed as sensational tactile or haptic feel that is provided electronically, or by physical bump similar to the ones on keys F and J or 5 on standard US keyboards. Each multi-touch back surface may have one or more fast-positioning bumps or elevations. The coordinates of the physical bumps or elevations are static but the coordinates and intensity of sensational tactile or haptic bumps or elevations may be adjusted and preprogrammed dynamically on each multi-touch back surface.

DETAILED DESCRIPTION—FIG. 16—TENTH EMBODIMENT

Figure 16:
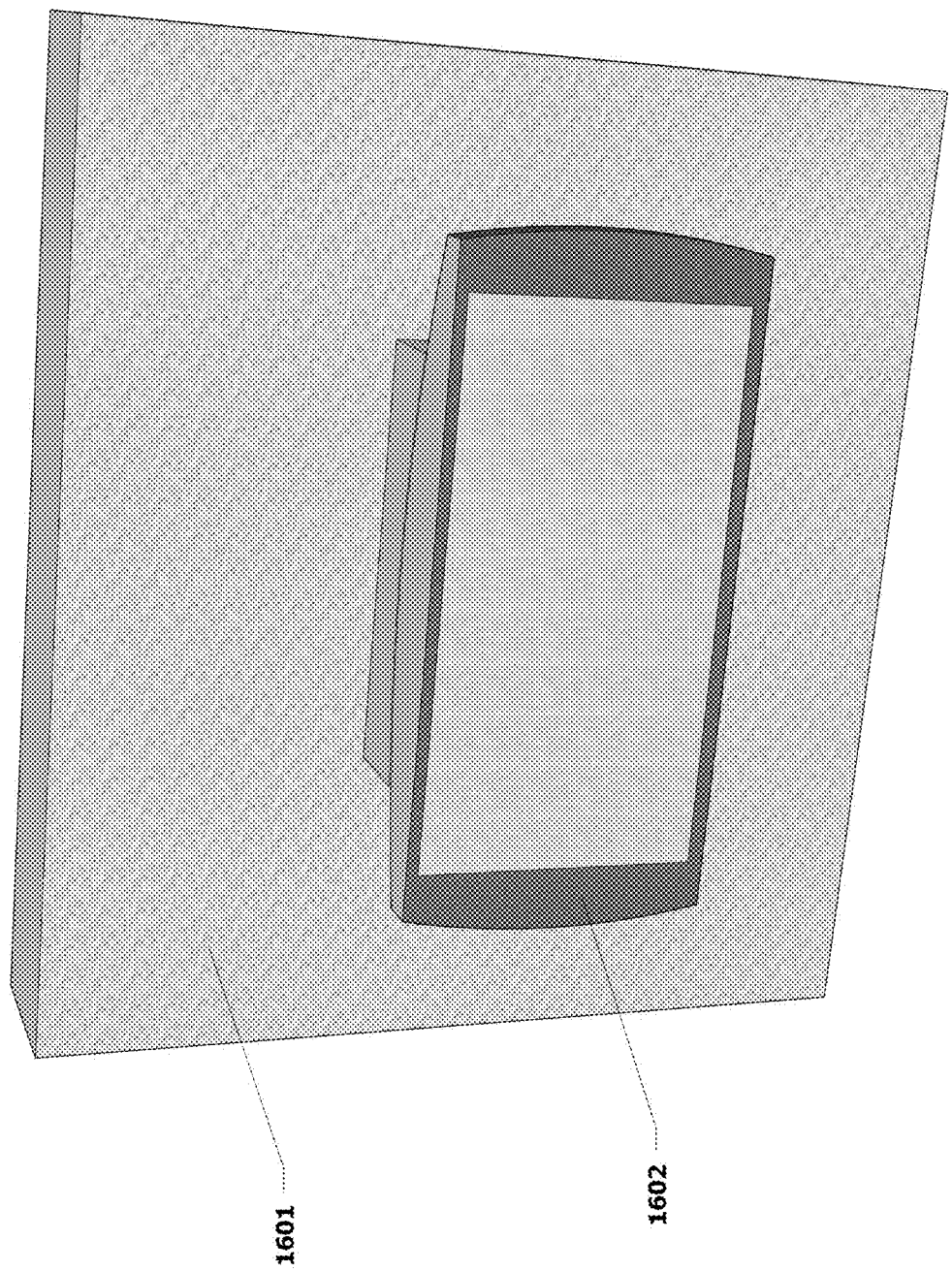
FIG. 16 shows the 10th embodiment mounted on or built in a wall.

The ninth non-limiting exemplary embodiment as shown in FIG. 16 is an example of a device statically mounted on or built into the wall. As shown in FIG. 16, device 1602 is mounted on wall 1601. Said device may be mounted or installed on any suitable surface or on any other device.

Figure 17:
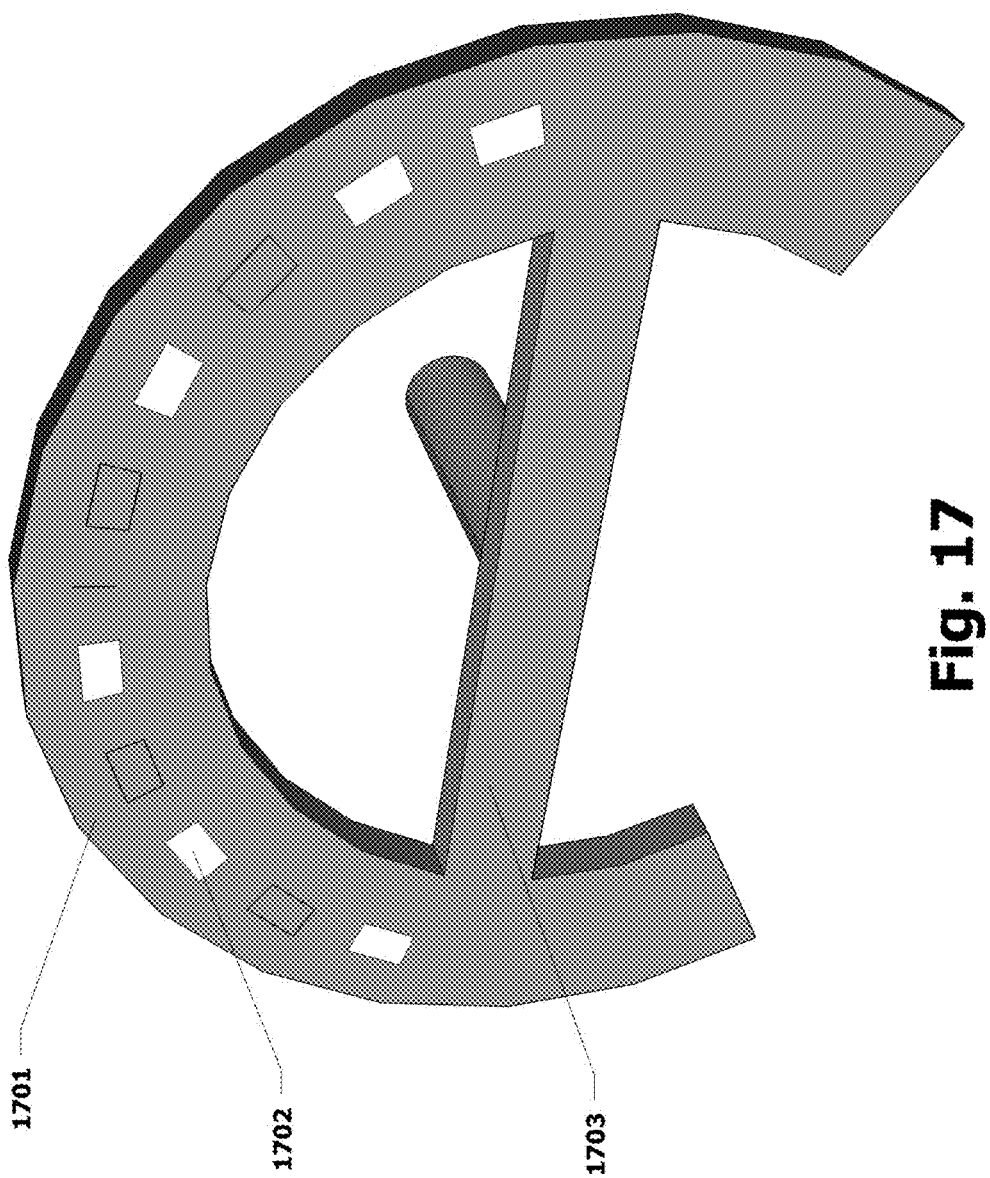
FIG. 17 shows the 11th embodiment in the form of steering wheel.
Figure 18:
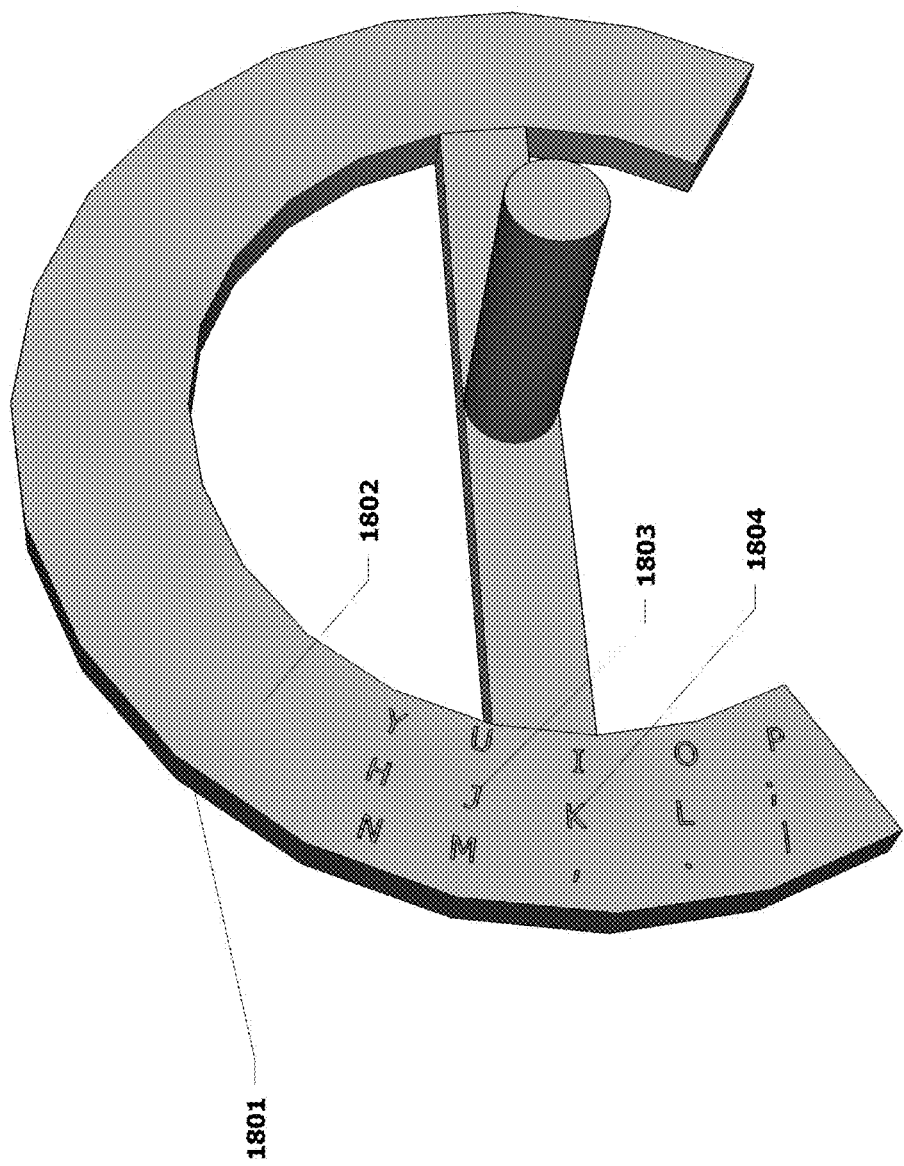
FIG. 18 shows the back of the 11th embodiment.

DETAILED DESCRIPTION—FIGS. 17 and 18—ELEVENTH EMBODIMENT

Another non-limiting exemplary embodiment shown in FIGS. 17 and 18 is a steering wheel of an automobile, or a gaming console, or a navigation system. As shown in FIG. 17, several static keys including keys 1702 and 1703 are mounted on surface 1701. FIG. 18 shows touch-sensitive multi-touch surface 1801 on the edge of the wheel, and touch-sensitive multi-touch surface 1802 on the back side of the wheel. Keys 1803 and 1804 and examples of two home keys mapped on the 1802 surface.

Operation—Ninth to Eleventh Embodiments

Embodiments nine, ten, and eleven are also examples of ergonomically designed devices. Said embodiments operate like the first embodiment. Optional fast-positioning tactile or heptic bumps or elevations can be programmed at the initial setup when a user rests fingers on the touch-sensitive back surfaces. The coordinates of the tips of the fingers at the resting positions is registered in the non-volatile memory and becomes active until disabled or reprogrammed manually or dynamically.

CONCLUSION, RAMIFICATION, AND SCOPE

Thus the reader will see that one or more exemplary embodiments of a computer keyboard provides healthier posture of fingers, wrists, hands, and arms; more ergonomic convenience, and faster typing speed. It can be integrated and enhance the capabilities of a stationary device to be used in navigation or other industries, as well as used by the blind.

One or more exemplary embodiments provide an input device with dynamically mapped keys on two of its back surfaces, with vertically and horizontally adjustable angles between the back surfaces.

Shoulders, arms, wrists, and fingers of operators of the provided embodiments are no longer confined to statically positioned keys; rather the dynamic keys follow the fingers of operators. Unlike a conventional flat keyboard with front-facing keys, the wrists of operators no longer sit on the median nerve; developing Carpal Tunnel Syndrome; nor are confined to the sides of a one-piece, non-adjustable keyboard with statically positioned keys.

With touch-sensitive surfaces on units dedicated to each hand, the operator can adjust the distance between the units and adjust the angle of each unit in 360 degree in a 3-dimensional sphere, independent of each other; provided by one or more exemplary embodiments, the hands of the operator do not have to be bound to otherwise static and un-adjustable units in order to type. Operators may adjust each unit independently. A greater space is also available on the front-facing surface of such devices for applications since the majority of the keys are mapped and activated on the back surfaces.

One or more exemplary embodiments provide an input device with flexibility of switching into a keyboard, a keypad, a navigation pad, an arrow-pad, a mouse-pad, a multi-mouse pad, or a calligraphic pad.

Versatile and customizable layouts provide for different types of input devices in different modes of operation. It also meets the needs of different operators such as the Blind and people with less than 10 active fingers. A sound module reads every single character as entered, a word, a paragraph, and a command using human speech. The sound module automatically detects typos and provides option to correct a misspelled word or to correct a grammatical error using human speech or other notification methods.

Thus, several advantages of one or more aspects include advanced ergonomic features that not only help overcome stress on shoulders, arms, wrists, fingers, and prevent backaches and fatigue; but also provide faster typing speed. The flexibility of moving fingers from the initial resting position during operation provides greater comfort. Hence, increased typing speed, greater efficiency is achieved while operators maintain healthier posture of fingers, wrists, hands, arms, and the body.

While my above description contains several exemplary embodiments, many other variations are also possible. For example many types of embodiments may be manufactured in different sizes, weights, colors, material, shapes, or connect and communicate with attached or remote devices in different manner or operate in different mode or function.

The invention claimed is:

1. A data processing input device:
   a. having a stationary housing with one or a plurality of touch-sensitive surfaces on the back or the reverse side of said housing, as well as on the front and sides of the housing, for detecting a variety of movements and actions of one or a plurality of fingers or objects on said touch-sensitive surfaces, and
   b. having first means for customizing keyboard keys, building keyboard layouts, choosing one of said keyboard layouts, and mapping said keyboard keys on one or a plurality of said touch-sensitive surfaces, at and around the coordinates of the contact points between one or a plurality of fingers or objects at resting position and, one or a plurality of said touch-sensitive surfaces, and c. having second means for assigning non-home keys to each of a plurality home keys, wherein each non-home key and home key are provided a location coordinate, remapping a new location coordinate of the home key, and in response, recalculating and remapping the location coordinate of all associated non-home keys of said home key, switching to different operational modes, Text Mode, Extended Mode, Arrows Mode, Keypad Mode, Mouse Pad Mode, Multiple Mouse Pad Mode, Calligraphic Pad Mode, new modes of operation by creating new customized layouts, generating codes in response to activating said mapped keys with one or a plurality of fingers or objects; or generating codes when operating in one and a plurality of pointing device mode, by making gestures with one or a plurality of fingers with or without other objects on said touch-sensitive surfaces, and sending or transmitting said generated codes to one or a plurality of computers or computerized devices.

2. The data processing input device in claim 1 further having facility for attaching to a computerized device.

3. The data processing input device in claim 1 wherein said touch-sensitive surfaces are adjustable such that the operator may change the position of each of said touch-sensitive surfaces in a 3-dimensional sphere relative to the rest of said touch-sensitive surfaces.

4. The data processing input device in claim 1 wherein said touch-sensitive surfaces are adjustable such that the operator may change the angle between said touch-sensitive surfaces in a 3-dimensional sphere in any direction.

5. The data processing input device in claim 1 wherein said first means assigns each group of keys to a finger, defines the relationships between a home key and associated non-home keys, dynamically remaps home keys and non-home keys by calculating the distances and the angles between the previous and current resting position of fingers or objects when a finger shifts and rests on a new location.

6. The data processing input device in claim 1 wherein said front, side, and back surfaces further having mechanical keys and statically mapped keys in addition to the touch-sensitive surfaces on the rear or reverse side of said input device.

7. The data processing input device in claim 1 wherein said touch-sensitive side and back surfaces are optionally having mechanical bumps or elevations, or sensational tactile or haptic bumps or elevations, which the coordinates and intensity of said bumps or elevations are manually or dynamically programmable at the resting positions on said touch-sensitive side and back surfaces.

8. A method of entering data comprising:
a. providing a stationary data processing input device with touch-sensitive surfaces on the front, sides and on the reverse side of said input device such that the fingers of the operator rest on the reverse side of said input device, with thumbs resting on one of said side or front surfaces, and
b. providing virtual keys that are dynamically mapped and remapped on said touch-sensitive surfaces, at and around the coordinates of the contact points between one or a plurality of fingers at the resting position and, one or a plurality of said touch-sensitive surfaces, and
c. assigning non-home keys to each of a plurality home keys, wherein each non-home key and home key are provided a location coordinate, remapping a new location coordinate of the home key, and in response, recalculating and remapping the location coordinate of all associated non-home keys of said home key, switching to different operational modes, Text Mode, Extended Mode, Arrows Mode, Keypad Mode, Mouse Pad Mode, Multiple Mouse Pad Mode, Calligraphic Pad Mode, new modes of operation by creating new customized layouts, activating said mapped keys by tapping or by other gestures with one or a plurality of fingers or objects, generating codes in response to activating keys, generating codes when operating in one and a plurality of pointing device mode, by making gestures with one or a plurality of fingers, with or without other objects, on said touch-sensitive surfaces, and sending or transmitting said generated codes to one or a plurality of computers or computerized devices.

9. The method of claim 8 wherein said input device further providing facility for attaching to a computerized device.

10. The method of claim 8 wherein said touch-sensitive surfaces are adjustable such that the operator may change the position of each of said touch-sensitive surfaces, in a 3-dimensional sphere relative to the rest of said touch-sensitive surfaces.

11. The method of claim 8 wherein said touch-sensitive surfaces are adjustable such that the operator may change the angle between said touch-sensitive surfaces in a 3-dimensional sphere in any direction.

12. The method of claim 8 wherein each group of keys are assigned to a finger, the relationships between a home key and associated non-home keys are defined, the new location of said dynamically remapped home keys and non-home keys are calculated based on the distances and the angles between the previous and current resting position of fingers or objects when a finger shifts and rests on a new location.

13. The method of claim 8 wherein said touch-sensitive side and back surfaces are optionally having mechanical bumps or elevations, or sensational tactile or haptic bumps or elevations, which the coordinates and intensity of said bumps or elevations are manually or dynamically programmable at the resting positions on said touch-sensitive side and back surfaces.

14. The data processing input device in claim 1 further having A sound module:
a. having first means to receive signals pertaining to activated keys of an input device and to read and pronounce each character, command, and completed words out load immediately, automatically and simultaneously, and
b. having second means to automatically notify the operator with the option to correct misspelled words or grammatical errors,
whereby said sound module eliminates sole dependency on a display screen to read detect, and correct misspelled words or grammatical errors.

15. The audio and voice generator in claim 14 wherein said automatic error notification is in the form of human voice.

16. The method of claim 8 further having a method of notifying the operator of an input device comprising:
a. providing an audio module for reading and pronouncing entered letters, commands, and completed words out load automatically and simultaneously, and,
b. providing error notification to the operator of said input device when an entered word is misspelled or when a grammatical error occurs, and providing options to correct said misspelled words or correct said grammatical error.

17. The method in claim 16 wherein said automatic error notification is in the form of human voice.

* * * * *